United States Patent
Comley

(10) Patent No.: US 11,585,961 B2
(45) Date of Patent: Feb. 21, 2023

(54) META-MATERIAL, DEVICES AND METHODS OF USE THEREOF

(71) Applicant: THE SECRETARY OF STATE FOR DEFENCE, London (GB)

(72) Inventor: Andrew James Comley, Reading (GB)

(73) Assignee: The Secretary of State for Defence, London (GB)

( * ) Notice: Subject to any disclaimer, the term of this patent is extended or adjusted under 35 U.S.C. 154(b) by 636 days.

(21) Appl. No.: 16/338,567

(22) PCT Filed: Oct. 3, 2017

(86) PCT No.: PCT/GB2017/000146
§ 371 (c)(1),
(2) Date: Apr. 1, 2019

(87) PCT Pub. No.: WO2018/065745
PCT Pub. Date: Apr. 12, 2018

(65) Prior Publication Data
US 2020/0038995 A1 Feb. 6, 2020

(30) Foreign Application Priority Data
Oct. 3, 2016 (GB) .................. 1616757

(51) Int. Cl.
*G21B 1/23* (2006.01)
*G02B 1/00* (2006.01)
(Continued)

(52) U.S. Cl.
CPC .......... *G02B 1/002* (2013.01); *G02F 1/0126* (2013.01); *G02F 1/3515* (2013.01); *G21B 1/23* (2013.01);
(Continued)

(58) Field of Classification Search
CPC ..... G02B 1/002; G02F 1/0126; G02F 1/3515; G02F 2203/30; G21B 1/23; H01Q 15/0086
(Continued)

(56) References Cited

U.S. PATENT DOCUMENTS 3,530,301 A * 9/1970 Boyd .................... G02F 1/3534
330/56
4,714,902 A 12/1987 Rokni et al.
(Continued)

FOREIGN PATENT DOCUMENTS

| GB | 2556999 B | 6/2020 |
|---|---|---|
| WO | 2006023195 A2 | 3/2006 |
| WO | 2006055798 A1 | 5/2006 |

OTHER PUBLICATIONS

Nakanishi, Toshihiro, Yasuhiro Tamayama, and Masao Kitano. "Efficient second harmonic generation in a metamaterial with two resonant modes coupled through two varactor diodes." Applied Physics Letters 100.4 (2012): 044103. (Year: 2012).*
(Continued)

*Primary Examiner* — Jack W Keith
*Assistant Examiner* — Jinney Kil
(74) *Attorney, Agent, or Firm* — Kilpatrick Townsend & Stockton LLP

(57) ABSTRACT

This invention relates to a device for rapid focus control of one or more lasers. The controlled beam (5), is refracted by the dynamic refraction device (1) whose refractive index is set by its response to the control beam (3). The invention can be used for rapid focus and re-focus of a laser on a target as might be useful in such industries as flat panel television manufacturing, fuel injector nozzle manufacture, laser material processing/machining, laser scanning and indirect drive inertial confinement fusion.

18 Claims, 10 Drawing Sheets

(51) Int. Cl.
G02F 1/01 (2006.01)
G02F 1/35 (2006.01)
G02F 1/355 (2006.01)
H01Q 15/00 (2006.01)

(52) U.S. Cl.
CPC .......... G02F 1/355 (2013.01); G02F 2202/30 (2013.01); H01Q 15/0086 (2013.01)

(58) Field of Classification Search
USPC ........................................ 376/102, 103, 104
See application file for complete search history.

(56) References Cited

U.S. PATENT DOCUMENTS

| | | | | |
|---|---|---|---|---|
| 4,784,450 | A * | 11/1988 | Jain | G02F 1/3536 385/11 |
| 7,864,394 | B1 * | 1/2011 | Rule | H01Q 15/0086 359/244 |
| 2006/0109540 | A1 | 5/2006 | Kueks et al. | |
| 2007/0188385 | A1 | 8/2007 | Hyde et al. | |
| 2008/0180786 | A1 | 7/2008 | Bratkovski | |
| 2009/0201572 | A1 | 8/2009 | Yonak | |
| 2010/0141358 | A1 * | 6/2010 | Akyurtlu | H01P 1/20 333/219.1 |
| 2011/0317275 | A1 * | 12/2011 | Smith | H01Q 15/08 359/652 |
| 2012/0019901 | A1 | 1/2012 | Mazumder | |
| 2013/0155492 | A1 * | 6/2013 | Shen | G02B 6/10 359/326 |
| 2014/0085711 | A1 * | 3/2014 | Sonkusale | H01P 7/088 359/350 |
| 2014/0211298 | A1 | 7/2014 | Sayyah et al. | |
| 2016/0259175 | A1 * | 9/2016 | Ellenbogen | G02B 5/30 |

OTHER PUBLICATIONS

Zharov, Alexander A., Ilya V. Shadrivov, and Yuri S. Kivshar. "Nonlinear properties of left-handed metamaterials." Physical Review Letters 91.3 (2003): 037401. (Year: 2003).*
Spaech, M. L., K. R. Manes, and C. C. Widmayer. "The National Ignition Facility wavefront requirements and optical architecture [R] " (2004). (Year: 2004).*
Kehne, David. "Toward laser fusion." SPIE (2013). https://spie.org/news/4894-toward-laser-fusion?SSO=1 (Year: 2013).*
Igumenshchev, I. V., et al. "Laser-beam zooming to mitigate crossed-beam energy losses in direct-drive implosions." Physical Review Letters 110.14 (2013): 145001. (Year: 2013).*
United Kingdom Patent Application No. 1716050.8, Response to Combined Search and Examination Report, dated Oct. 2, 2018, 9 pages.
United Kingdom Patent Application No. 1716050.8, Examination Report, dated Jul. 25, 2019, 3 pages.
United Kingdom Patent Application No. 1716050.8, Response to Examination Report, dated Sep. 16, 2019, 65 pages.
United Kingdom Patent Application No. 1716050.8, Intention to Grant, dated Mar. 19, 2020, 2 pages.
Alù et al., "Negative effective permeability and left-handed materials at optical frequencies," Optics Express, Feb. 20, 2006, pp. 1557-1567, vol. 14, No. 4, Optical Society of America.
European Patent Application No. 17794397.4, Office Action dated Mar. 24, 2020, 8 pages.
Engheta, Nader, "Circuits with Light at Nanoscales: Optical Nanocircuits Inspired by Metamaterials," Science, Sep. 21, 2007, pp. 1698-1702, vol. 317, American Association for the Advancement of Science.
Filonov, Dmitry, et al., "Resonant meta-atoms with nonlinearities on demand," Applied Physics Letters, Sep. 12, 2016, pp. 111904-1-111904-4, vol. 109, No. 11, AIP Publishing LLC, US.
Kamali, Seyedeh Mahsa, et al., "Decoupling optical function and geometrical form using conformal flexible dielectric metasurfaces," Nature Communications, May 19, 2016, pp. 1-7, Springer Nature Publishing AG.
Lapine, Mikhail, et al., "Colloquium: Nonlinear metamaterials," Reviews of Modern Physics, Sep. 12, 2014, pp. 1093-1123, vol. 86, No. 3, American Physical Society.
Liu, L. Y., et al., "Artificial Magnetic Properties of Dielectric Metamaterials in Terms of Effective Circuit Model," Progress in Electromagnetic Research, 2011, pp. 159-170, vol. 116, EMW Publishing.
Zheludev, Nikolay I., et al., "From metamaterials to metadevices," Nature Materials, Oct. 23, 2012, pp. 917-924, vol. 11, No. 11, Springer Nature Publishing AG.
United Kingdom Patent Application No. GB 1616757.9, Combined Search and Examination Report dated Nov. 21, 2016, 6 pages.
United Kingdom Patent Application No. GB 1716050.8, Combined Search and Examination Report dated Mar. 26, 2018, 7 pages.
International Patent Application No. PCT/GB2017/000146, International Search Report and Written Opinion dated Jan. 12, 2018, 19 pages.

* cited by examiner

META-MATERIAL, DEVICES AND METHODS OF USE THEREOF

TECHNICAL FIELD

This invention relates to a meta-material and specifically to dual resonant meta-materials and their ability to interact with electromagnetic radiation such as lasers etc, and to the rapid control thereof leading to broad applications such as flat panel television manufacturing, fuel injector nozzle manufacture, signal processing, signal switching, laser material processing/machining, laser scanning and particularly for direct or indirect drive inertial confinement fusion with respect to increasing the laser to target energy coupling efficiency. Inertial confinement fusion schemes provide a potential route to future commercial nuclear fusion reactors for green power provision.

BACKGROUND ART

It is known in the fields to use a control laser to induce a refractive index gradient into a medium nominally termed 'laser-controlled optics'.

A control laser beam may be spatially and temporally overlapped with the beam to be controlled in a non-resonant, nonlinear medium, and refractive index variations can be induced via the known optical Kerr effect. It is notable though that the control beam must necessarily be much more intense than the controlled beam to ensure that its contribution to the induced refractive index is dominant.

It is also known to employ an alternative scheme in which the control beam is weak compared to the controlled beam with an atomic gas being employed as the refracting medium (U.S. Pat. No. 4,714,902). In this scheme, the frequencies of both the controlled and control beams are tuned close to different atomic resonances; the wavelength of the control beam is therefore necessarily different to that of the controlled beam. Whilst this scheme utilises a weak control beam to control a strong beam, significant limitations are imposed; it relies on the availability of a gaseous medium with atomic resonances matched to the desired frequencies of the controlled and control beams and naturally is burdensome to employ practically or commercially requiring gaseous cells, ovens, temperature control and vacuum means to enable the use of the likely alkali metal gases. Furthermore the characteristic response time is marginal for the desired applications.

Meta-materials are a highly active area of research and it has been shown (N. Engheta, Science 317, 1698 (2007)) that for various construction configurations of such materials they exhibit responses akin to a lumped circuit having inductance, capacitance and resistance elements. It has been shown that electromagnetic radiation can couple with such material circuits at various wavelengths including in the visible region.

It would be useful to have a material and device that could use a low intensity laser to control a high intensity laser via a non-linear medium but without the encumbrance of using a gaseous medium limiting the frequency range for the lasers, nor imposing huge infra-structure requirements on existing facilities, yet able to control large scale lasers and critically also to do so on a sub-nanosecond timescale.

DISCLOSURE OF INVENTION

According to a first aspect of the invention there is provided a meta-material comprising: a unit cell comprising a first resonant structure and a second resonant structure, characterised in that the first resonant structure and a second resonant structure are coupled to each other through a common element which in use has a nonlinear response to applied electric fields.

Advantageously, having a dual resonant structure allows the material to be constructed to interact with two or more separate stimuli. The material can be constructed such that it is tuned to be more resonant with one of the stimuli such that this has a dominant effect on the material. This in turn sets the voltage across the non-linear common element meaning that this dominant response thereby also effects the other stimuli which may now be changed through change in the dominant structure interaction. This building material provides for very rapid communication and change between the structures and so may have very broad applications for electromagnetic radiation control.

Optionally the common element comprises a dielectric material. Dielectric materials are available in great variety and methods for preparing and processing them are well known in the art.

Optionally the dielectric material has a third order non-linear susceptibility not equal to zero. The general analysis below shows that in this case the refractive index change experienced by the controlled beam is proportional to the intensity of the control beam. This linear design relationship ensures that the refractive index experienced by the controlled beam tracks the intensity of the control beam in a simple fashion. The intensity of the control beam is readily controlled using, for example, electro-optic modulation technology as is well known in the art.

Optionally the first resonant structure or the second resonant structure or both may comprises any of a split ring resonator, a ring of plasmonic spheres or a dielectric element. Split ring resonators are simple structures which offer a high degree of tuneability in terms of their size, shape and composition and can be readily manufactured. Furthermore their response to electromagnetic radiation is well understood. A ring of plasmonic spheres offers the possibility of extending the split ring resonator concept to optical frequencies. A dielectric element, such as a dielectric sphere, is a simple object readily manufactured and can exhibit a resonant interaction (Mie resonance) with electromagnetic radiation simply by choosing its size according to the wavelength of the electromagnetic radiation.

Optionally the first resonant structure is configured substantially orthogonal to the second resonant structure. In this arrangement, the first resonant structure interacts directly only with the control electromagnetic radiation, and the second resonant structure interacts directly only with the controlled electromagnetic radiation.

Optionally the unit cells are arranged in an array to form a meta-layer. A meta-layer is a thin, effective optic which can be designed to modify the propagation characteristics of electromagnetic radiation in a desired manner.

Optionally meta-material comprises a plurality of meta-layers separated by dielectric layers (e.g. air, glass) or vacuum. Several meta-layers, when used in combination, perform as a compound effective optical system which offers many degrees of design freedom such that the propagation characteristics of electromagnetic radiation can be precisely controlled.

Optionally the unit cells may be arranged in a three-dimensional array. This approach allows for the enhancement of the useful effect of the meta-material simply, by increasing the size of the array.

According to a second aspect of the invention there is provided a dynamic refraction device comprising the meta-material of claims 1-9.

Advantageously desired refractive index gradients can be induced in the refraction device according to the spatial and temporal intensity characteristics of the control radiation (beam) using methods well known in the field. By choosing the spatial variation of the induced refractive index gradient appropriately, a lens or prism (or combination of the two) for example can be induced in the refraction device. This allows vastly rapid changes of the devices refractive index to be determined by the control beam, meaning that equal fast propagation control can be applied any secondary beam(s) passing through the device.

Beneficially the control beam by its nature can be readily transported to the refraction device which may be at a remote location. As the refraction properties of the refraction device are set at-a-distance by the control beam, no power supply or other auxiliary components are required in the vicinity of the refraction device.

A further advantage is that the refraction device can be inserted near the end of an existing laser beamline, near the final focussing optic.

Optionally the dynamic refraction device can be formed as a secondary dynamic layer on an optical lens. Advantageously thereby minimising the impact of the dynamic refraction capability on any existing optical systems i.e. the controlled beam propagation characteristics up to the final focussing lens do not need to be modified in order to accommodate the refraction device.

Another advantage of this device is that due to the inherent fast meta-material response to the weak control beam the strong second beam to be controlled is virtually instantaneously also so affected. Rates of change within the weak electromagnetic control beam of the order of singular picosecond timeframes can be correspondingly thus induced in the strong controlled electromagnetic beam however it will appreciated that the meta-material response timeframe will be vastly quicker than the existing ability of rate of modifying the control beam, hence improvements in this regard would allow for even shorter control timeframes.

For a controlled beam operated in continuous wave or in single-pulse mode, the focus position of the controlled beam can therefore be dynamically varied on a timescale down to on the order of a picosecond during the time period in which the controlled beam interacts with the target.

For a controlled beam operated in multi-pulse mode, the refraction properties of the refraction device and therefore the focus position of the controlled beam can also be changed from pulse to pulse by operating the control beam in multi-pulse mode and varying the control beam intensity from pulse to pulse.

Another advantage of this device is that by varying the geometric construction of the overall meta-material structure and by choosing appropriate constituent materials to tune its material response a wide section of the electromagnetic spectrum can be used and controlled including visible wavelengths such as below 800 nanometres.

A further advantage of this device is that the controlled beam aperture size is limited only by the limits of the meta-material construction.

Optionally the dynamic refraction device comprises discrete focal zones. As described later this approach enables the power requirement on the control laser for the multiple zone case to be reduced compared to the single focal zone case.

According to a third aspect of the invention there is provided a laser machining apparatus comprising a controlled laser source; a dynamic refraction device according to any of claims 10-12 and a control electromagnetic source. Such a system permits precise spatial and temporal control over the focussing characteristics of the controlled laser source such that the quality and/or efficiency of the machining process is increased.

According to a fourth aspect of the invention there is provided an electromagnetic signal processing apparatus comprising: a controlled electromagnetic source; a dynamic refraction device according to any of claims 10-12; a control electromagnetic source; and an electromagnetic signal receiver. Such a system permits precise spatial and temporal control over the controlled electromagnetic source power delivered to the input of the electromagnetic signal receiver, and the total controlled electromagnetic source power collected by the electromagnetic signal receiver.

According to a fifth aspect of the invention there is provided a method of controlling the propagation of a controlled electromagnetic radiation using a control electromagnetic radiation comprising: directing a controlled electromagnetic radiation through a dynamic refraction device according any of claims 10-12; directing a control electromagnetic radiation onto the dynamic refraction device which is configured to be resonant to the wavelength of the control electromagnetic radiation, such that the refractive index of the device experienced by the controlled electromagnetic radiation is substantially determined by the control electromagnetic radiation.

The control electromagnetic radiation, by its nature as a propagating wave, can be readily transported to the dynamic refraction device which may be located in a remote or difficult-to-access place. Furthermore its spatial, and temporal intensity characteristics can be readily modified to permit space and rapid time control of the refractive index experienced by the controlled electromagnetic, radiation.

Optionally the method described above can be continued and spatiotemporal variations of characteristics of the control electromagnetic radiation produce spatiotemporal variations in the refractive index experienced by the controlled electromagnetic radiation. In this way the phase of the controlled electromagnetic radiation and therefore its propagation characteristics can be controlled in space and time.

Optionally the methods described above can be used to control a laser in the visible electromagnetic spectrum. Visible lasers find use in a wide range of industrial applications, for example in machining applications.

Optionally the method described above can be used to allow two lasers in the visible electromagnetic spectrum to inter-act. This can be beneficial in communication applications where a signal (intensity variation) on one low intensity beam (control beam) has to be transferred to another beam (controlled beam) with shorter wavelength and higher intensity.

Optionally the method described above allows the control electromagnetic radiation to be a longer wavelength radiation than the controlled electromagnetic radiation. This feature is particularly advantageous when the controlled electromagnetic radiation has a wavelength in the visible range of the spectrum. In this case, sources of longer-wavelength control electromagnetic radiation (for example operating in the infra-red) are readily available. Shorter-wavelength sources (for example operating in the ultraviolet), though available, are often derived from these longer-wavelength (for example infra-red) sources by frequency conversion methods in nonlinear crystals. Frequency conversion comes at the expense of increased complexity and energy losses incurred in the conversion process. It is therefore preferable to control visible electromagnetic radiation sources with longer-wavelength sources.

According to a sixth aspect of the invention there is provided a method of imploding a nuclear fusion fuel source comprising: directing a controlled laser through a dynamic refraction device according to any of claims 10-12, onto the fuel source; directing a control laser onto the dynamic refraction device which is configured to be resonant to the wavelength of the control laser, such that the refractive index of the device experienced by the controlled laser is substantially determined by the control laser; adjusting the characteristics of the control laser during the implosion of the fuel source such that spatiotemporal properties of the refractive index of the device correspondingly change, thereby refocussing the controlled laser relative to the imploding fuel source. This approach offers a large benefit for inertial confinement fusion (ICF) applications. The dynamic refocusing effect can be employed rapidly such that energy coupling from the controlled electromagnetic radiation to the fuel is optimised at all times, leading to large gains in the efficiency of the ICF process.

According to a seventh aspect of the invention there is provided a method of signal amplification and wavelength transposition comprising: directing a controlled electromagnetic radiation through a dynamic refraction device according to any of claims 10-12, onto an optical collector for processing as a signal beam; directing a control electromagnetic radiation, of longer wavelength with respect to the controlled electromagnetic radiation, onto the dynamic refraction device which is configured to be resonant to the wavelength of the control electromagnetic radiation, such that the refractive index of the device experienced by the controlled electromagnetic radiation is substantially determined by the control electromagnetic radiation, time-varying the characteristics of the control electromagnetic radiation such that the refractive index of the dynamic refraction device is correspondingly changed, thereby refocussing the controlled electromagnetic radiation in accordance with the time varying characteristics of the control electromagnetic radiation which is then collected by the optical collector for signal processing. This is of use in applications, for example communications applications, where a signal (intensity variation) on one low-intensity beam (control beam) has to be transferred to another beam (controlled beam) with shorter wavelength and higher intensity.

According to an eighth aspect of the invention there is provided a method electromagnetic signal on-off gating comprising: directing a controlled electromagnetic radiation through a dynamic refraction device according to any of claims 10-12, onto an optical collector for processing; directing a control electromagnetic radiation onto the dynamic refraction device which is configured to be resonant to the wavelength of the control electromagnetic radiation, such that the refractive index of the device experienced by the controlled electromagnetic radiation is substantially determined by the control electromagnetic radiation, varying the characteristics of the control electromagnetic radiation such that the refractive index of the dynamic refraction device is configured to either focus the controlled electromagnetic radiation onto the optical collector creating an 'on' condition or deflecting the controlled electromagnetic radiation away from the optical collector creating an 'off' condition. This is of use for example, when a binary control signal carried on low-intensity electromagnetic radiation has to be transferred to a binary control signal carried on higher-intensity and longer-wavelength electromagnetic radiation. It could also be used to detect the presence of low-intensity (control) electromagnetic radiation, the system being configured to produce high-output (controlled) electromagnetic radiation when the low-intensity electromagnetic radiation is present or not present.

According to an eighth aspect of the invention there is provided a method for electromagnetic two way switching comprising: directing a controlled electromagnetic radiation through a dynamic refraction device according to any of claims 10-12, onto an optical collector for processing; directing a control electromagnetic radiation, onto the dynamic refraction device which is configured to be resonant to the wavelength of the control electromagnetic radiation, such that the refractive index of the device experienced by the controlled electromagnetic radiation is substantially determined by the control electromagnetic radiation; varying the characteristics of the control electromagnetic radiation such that the refractive index of the dynamic refraction device is configured to either focus the controlled electromagnetic radiation onto a first optical collector or deflecting the controlled electromagnetic radiation onto a second optical collector. Switching can therefore be accomplished without mechanical means hence can be achieved very rapidly.

One specific embodiment of the device will now be described by way of example only and with reference to the enclosed figures.

BRIEF DESCRIPTION OF DRAWINGS

FIG. 1 shows the refraction device 1, retrofitted to an existing electromagnetic emission system. It shows a set up for a dual or two-colour zooming system using a dynamic refraction device 1 constructed from a Meta-Material, these are materials consisting of sub-wavelength unit cells engineered to achieve a desired effective bulk medium response to electromagnetic radiation. However it will be appreciated that certain composite materials with unit cells with a size comparable to the wavelength described later may also offer similar resonant properties for parts of the electromagnetic spectrum.

The dynamic refraction device 1 is inserted in-line and close to before or after the final focussing optic 8 or as a meta-material layer coating on the final focussing optic. In FIG. 1, the chromatic dispersion in the final focussing optic is exploited to ensure that the control beam is defocused on the target. The control electromagnetic emission i.e. the control beam 3, emanates from the control source 2, and passes through a Modulator 6, which may be either temporal and/or spatial. The controlled electromagnetic emission i.e. the controlled beam 5, emanates from its controlled source 4, and is combined with the control beam 3, by a dichroic beam combiner 7. The dichroic beam combiner 7 may also be performed by an existing controlled beam turning mirror, the chosen turning mirror being of high reflectivity at the controlled beam frequency (for example, by means of a dielectric coating which is well known in the art) but of high transmission at other frequencies such as the frequency of the control beam. The multiple beams then pass through the refraction device 1, before being focussed by a final focussing optic 8, onto a potential target 9.

This arrangement ensures that any final beam conditioning induced by the refraction device 1, is done prior to interaction with the target without affecting the performance of optical components earlier in the beamline. FIG. 1 shows the use of chromatic aberration to defocus the control beam on target however it would be appreciated that other methods including but not limited to dichroic optics could also be used to combine and separate the controlled and controlling beams. Note that the properties of the dynamic element are set at-a-distance, and therefore no power supply or control components are required in its vicinity.

The refractive index of the dynamic refraction device 1, experienced by the controlled beam 5, is set by the material response of the refraction device 1, to the control beam 3.

Rapid (between or during pulse time frame) changes made in the condition of the control beam 3, will correspondingly be induced onto the controlled beam 5, via the refraction device 1.

It would be appreciated that through use of different known standard final focussing lenses the control beam may also be deflected and consequently spatially separated from the controlled beam on the target. The polarisation state of the control beam might also be made different to, that of the controlled beam and polarising optics used to separate the two beams such that the control beam is not incident on the target. By manipulating the polarisation states of the beams in this way, the wavelengths of the control and controlled beams can be made equal if required.

It will be appreciated by a person skilled in the art that, when this description refers to a particular wavelength (colour) of an electromagnetic beam it is apparent that in a practical implementation the beam will not be truly monochromatic (i.e. the beam will possess a finite spectral bandwidth) and in this case the central wavelength is referred to. Furthermore the coherence time of the electromagnetic beam will not be infinite and may take on a range of values in practice.

It will also be apparent that there are other embodiments of the invention that may include one or more control beams and or one or more controlled beams interacting via the dynamic refraction device.

Figure 2:
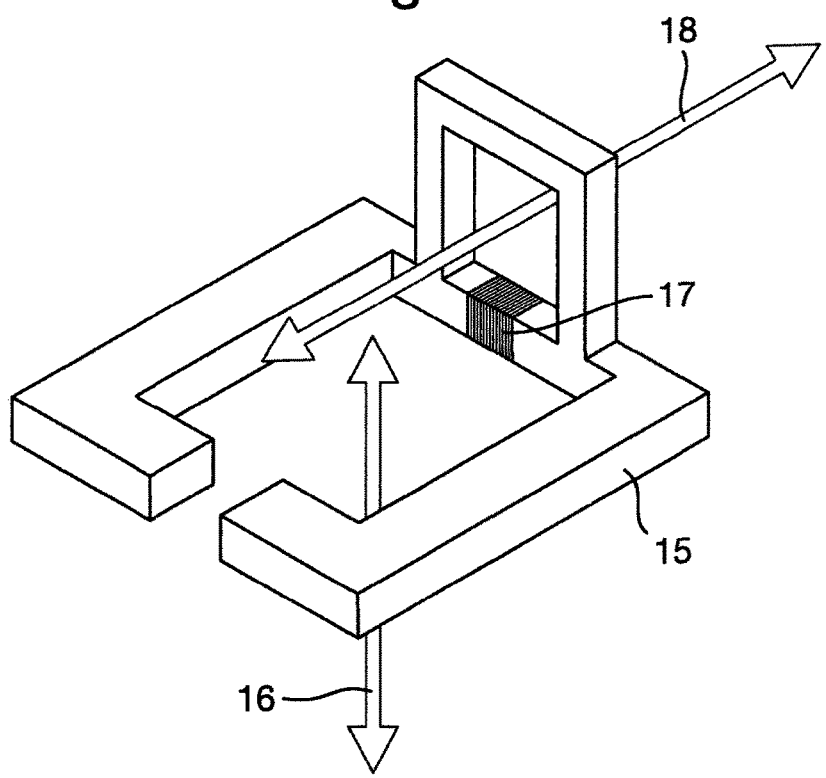
FIG. 2 Perspective view of a meta-molecule unit cell.

FIG. 2 shows one example of a meta-molecule unit cell 15. The dynamic refraction device 1, is constructed from one or more such unit cells arranged in a lattice. Herein is described the operation of the unit cell in terms of the elements required to perform the desired function, but it would be understood that in practice the described elements will be physically supported by a substrate or other structure not shown in FIG. 2. The unit cell 15, in FIG. 2 is based on two orthogonally-coupled split-ring resonators. In this case the system is being excited by two-colour/dual alternating magnetic fields (B-Fields) producing electromotive forces around the unit cell. It has a non-linear dielectric medium 17, in the capacitance gap. Arrows 16, and 18 represent the weak control beam B-Field (B1) and strong controlled beam B-Field (B2), respectively. The unit cell 15, is based on the well-known split-ring resonator (SRR) building block, and therefore is suitable for controlled beam wavelengths greater than approximately 800 nm however it will be appreciated as described later that other meta-material property responses can be exploited to refract other wavelengths including visible regions of the electromagnetic spectrum.

As previously described, the induced refractive index gradients can be chosen such that a lens, prism or a combination of the two can be induced in the refraction device 1. By choosing to induce a lens, the focus of the controlled beam can be moved along the beam propagation axis such that the size of the controlled beam on the target is varied to achieve a zooming effect. In this case, the effect of the refraction device 1, can be explained through standard thin lens analysis as discussed below.

Figure 3:
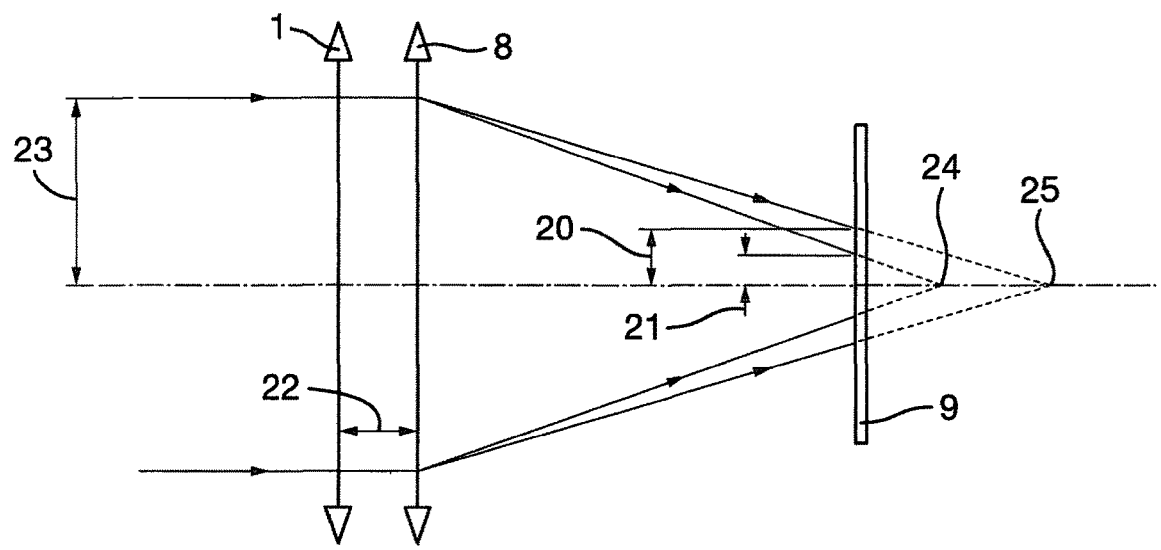
FIG. 3 Shows a simplified ray diagram for a zooming system with a positive refraction device.

FIG. 3 shows a simplified ray diagram for a zooming system (the controlling beam is not shown for clarity). The refraction device 1, which acts as a dynamic lens ($L_1$) and final focussing optic 8 ($L_2$) are represented by thin, positive lenses of focal lengths ($f_1$) and ($f_2$) respectively. The radius of the laser spot on the surface of target 9, prior to and after zooming is 20 ($r_1$) and 21 ($r_2$), respectively. The zoomed beam focus is 24, and the initial beam focus is 25.

Assuming that the lens, separation 22 ($d<<f_1$), a thin-lens analysis yields $$Z = \frac{r_2}{r_1} \sim 1 + \frac{f_2}{f_1}\left(1 - \frac{a}{r_1}\right)$$

where Z is the zooming factor and 23 (a) is the beam radius prior to focussing. Rearranging the above equation for $f_1/f_2$ gives $$\frac{f_1}{f_2} \sim \left(\frac{a}{r_1} - 1\right) \cdot \frac{1}{(1-Z)}$$

As $a/r_1 >> 1$ and Z is order of (but less than) unity, it follows that $$\frac{f_1}{f_2} \sim \frac{a}{r_1(1-Z)} \gg 1$$

and therefore that the dynamic lens can be made weak in comparison with the main focussing lens (i.e. $f_1 \gg f_2$).

Figure 4:
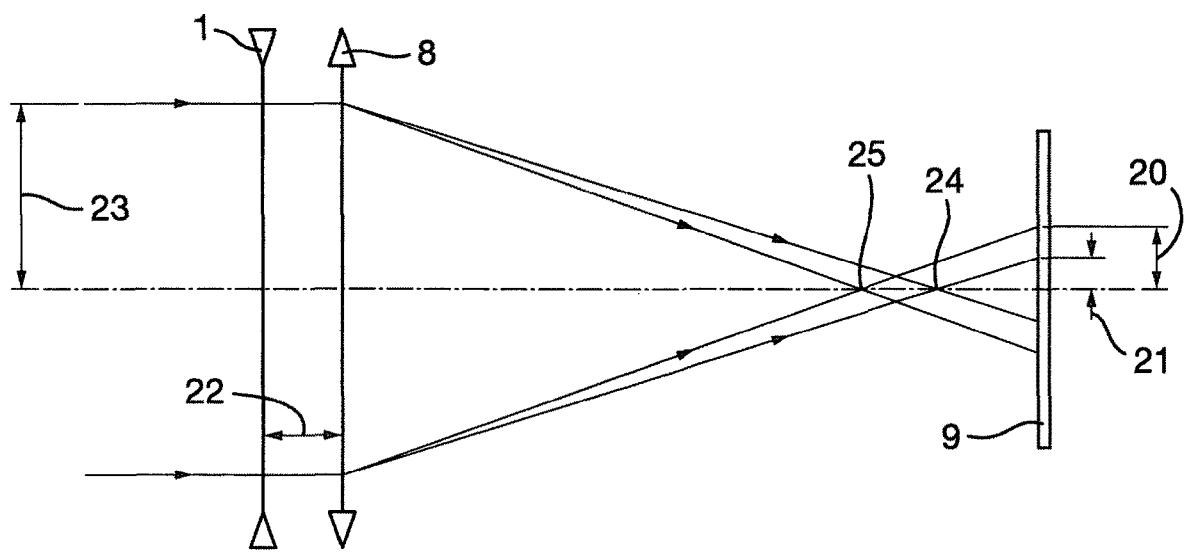
FIG. 4 Shows a simplified ray diagram for a zooming system with a negative refraction device.

FIG. 4 shows a similar zooming effect ($Z\tilde{}<1$) can also be achieved using a negative dynamic lens 1 ($L_1$).

In this case similar expressions for Z and $f_1/f_2$ are obtained:—

$$Z = \frac{r_2}{r_1} \sim 1 + \frac{f_2}{f_1}\left(1 + \frac{a}{r_1}\right), \quad f_1 \ll 0$$

$$\frac{f_1}{f_2} \sim \frac{-a}{r_1(1-Z)} \ll -1.$$

The above analyses show that a useful zooming function may be achieved using a weak dynamic lens. In the context of laser-controlled optics, the dynamic lens should be made as weak as possible, to minimise the power requirement of the control beam. This also ensures that the effect of the control beam on the environment (including the target being processed by the controlled beam) is minimised.

The power requirement of the controlling beam can be reduced further via application of the Fresnel principle: by dividing the dynamic lens aperture into several regions, the power requirement of the controlling beam may be reduced.

Figure 5:
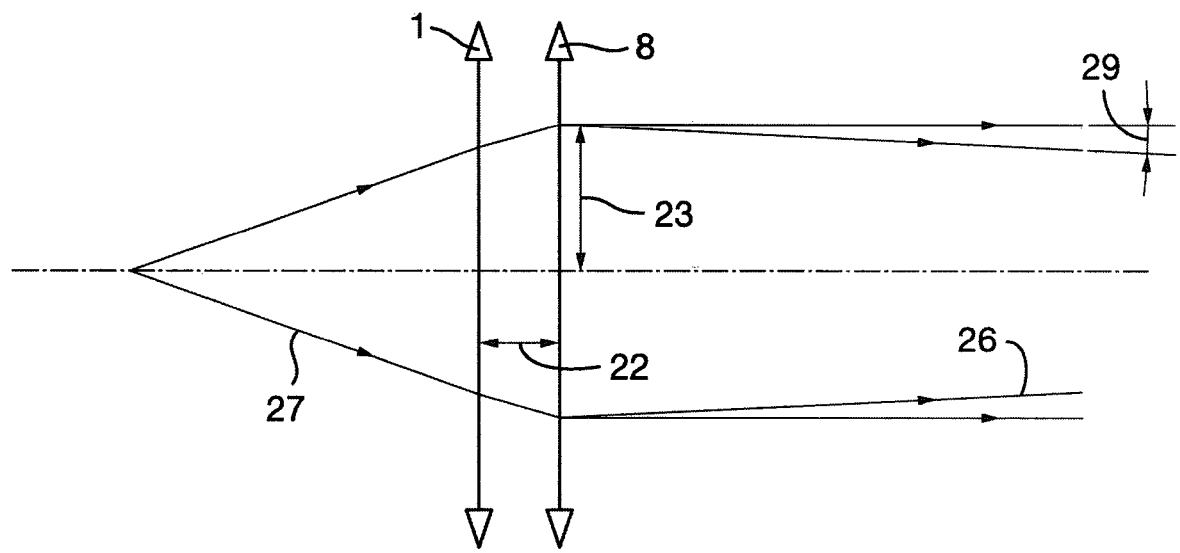
FIG. 5 Shows a converging beam diagram.
Figure 6:
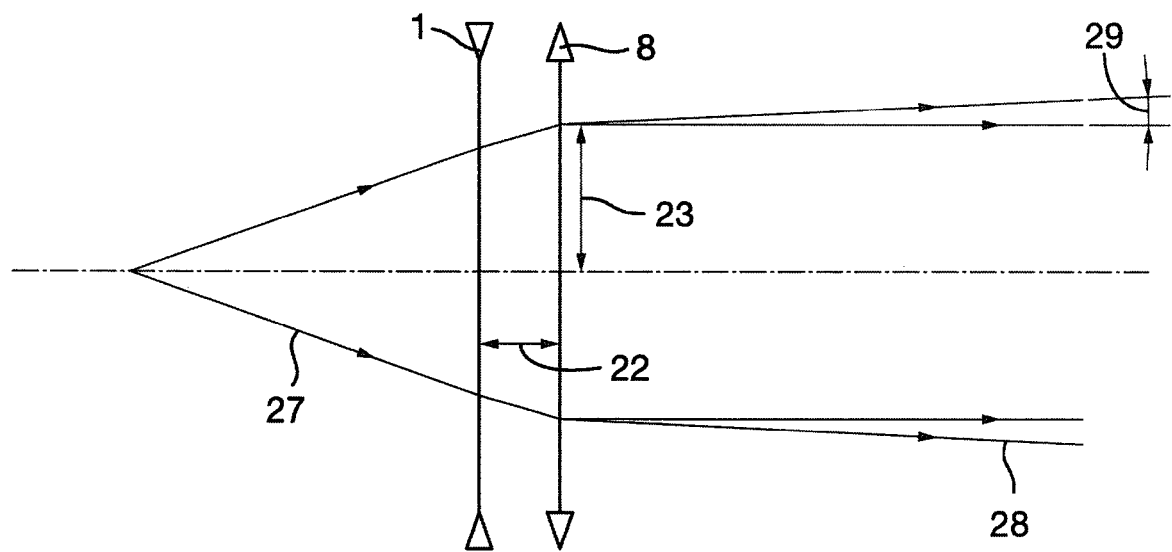
FIG. 6 Shows a diverging beam diagram.

FIGS. 5 & 6 show a final focussing optic 8, used to collimate a laser beam 27, (or more generally, an electromagnetic wave), a dynamic refraction device 1, used to vary the divergence angle 29, of the outgoing beam. The figures show variable-divergence beam implementations; final focussing optic 8 (positive lens $L_2$), collimates the beam 27, in the absence of a positive dynamic refraction device 1 ($L_1$). FIG. 5 illustrates that a positive dynamic refraction device 1 ($L_1$), results in a converging beam 26, at the output.

FIG. 6 illustrates that a negative dynamic refraction device 1 ($L_1$), results in a diverging beam 28 at the output. The control beam is not shown for clarity.

Alternatively, if the combination of the dynamic refraction device 1 ($L_1$), and the final focussing optic 8 ($L_2$), (when the control beam is set to peak intensity $I_1$) are chosen to produce a perfectly collimated beam, a change in $I_1$ will permit control of the output beam divergence to produce either perfect collimation, convergence or divergence at the output.

Figure 7:
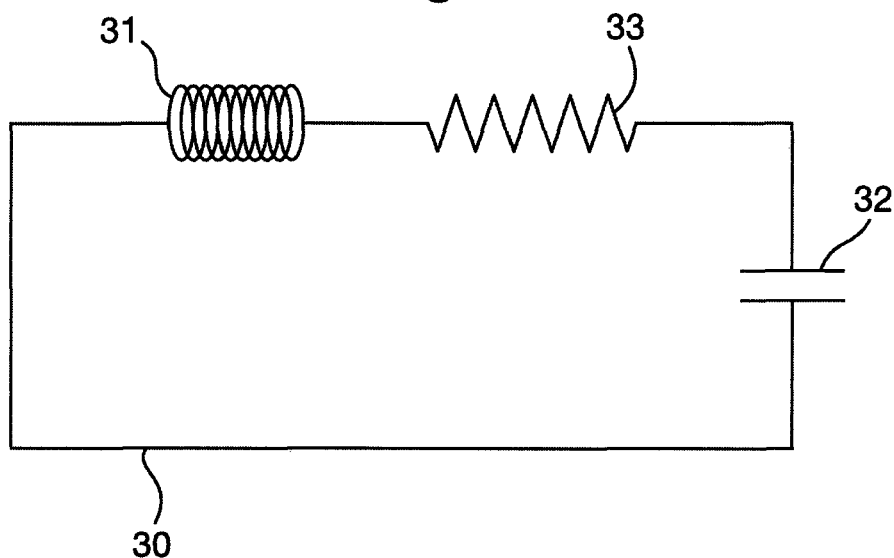
FIG. 7 Shows diagrammatically a meta-material unit cell modelled as a lumped-element circuit.

FIG. 7 shows the meta-material unit cell modelled as a single, lumped LCR (inductance-capacitance-resistance) circuit. It constitutes a fundamental 'meta-atom' 30, having inductance 31 (L), capacitance 32 (C), and resistance 33 (R):

Such a circuit has a well-known response to electromagnetic excitation which can explain many features of the meta-material behaviour. Electromagnetic waves may couple to this circuit in several ways.

Figure 8:
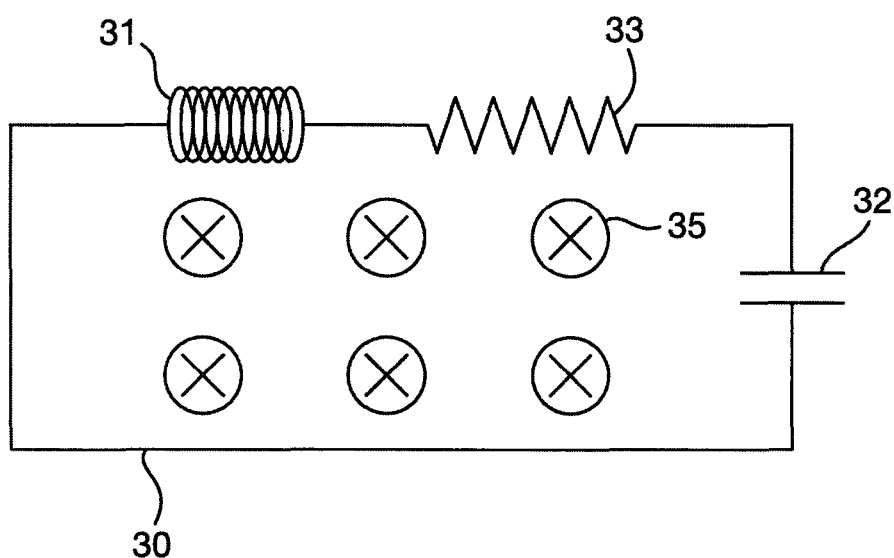
FIG. 8 Shows diagrammatically the coupling of an external alternating magnetic field to the circuit of FIG. 7.

FIG. 8 shows induction of an electromotive force around the circuit by an applied alternating magnetic field (B-field) 35, via Faraday's Law. This requires that the B-field has a component oscillating perpendicular to the plane of the loop.

Figure 9:
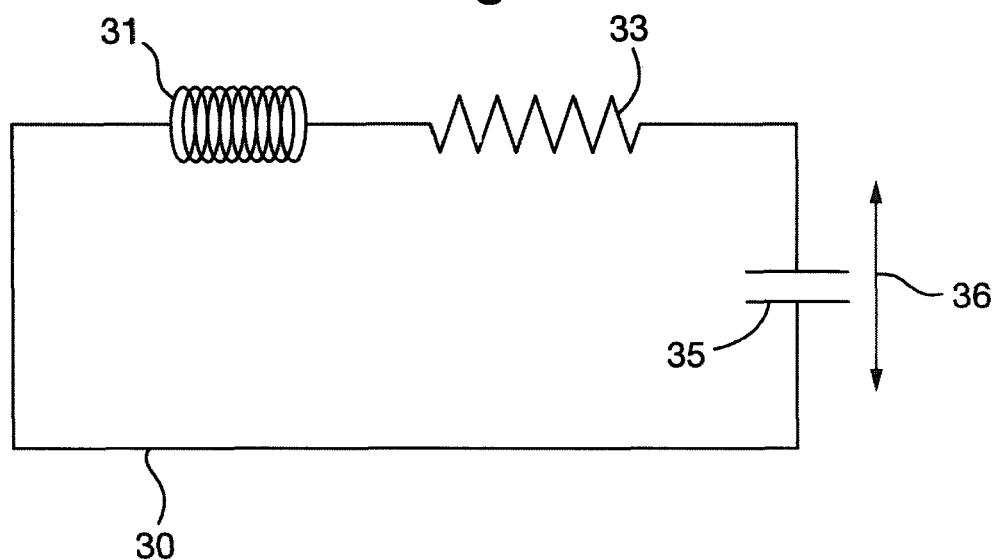
FIG. 9 Shows diagrammatically the coupling of an external alternating electric field across the capacitor gap in the circuit of FIG. 7.

FIG. 9 shows the coupling of an external alternating electric field 36 (E-field), directly across the capacitor gap. Both of these mechanisms require the fields or components of the fields to be orientated appropriately in relation to the LCR circuit.

Figure 10:
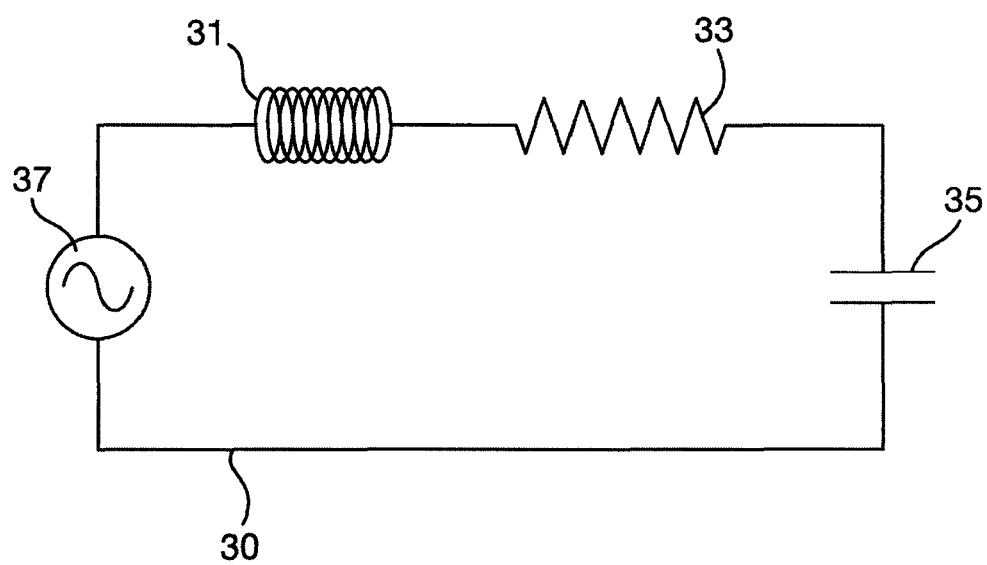
FIG. 10 Shows diagrammatically the induced voltage effect of an alternating magnetic field coupling with the circuit.

FIG. 10 shows the induced voltage due to an oscillating external B-field 35 represented as an AC voltage source V(t) 37 oscillating at the frequency of the B-field and driving the LCR circuit of FIG. 7.

The oscillating voltage V(t) can be calculated from Faraday's Law:—

$$V(t) = -A_{loop} \cdot \frac{\partial B}{\partial t} = jA_{loop}\omega B(t)$$

where $B(t)=B_0 e^{-j\omega t}$, $j=\sqrt{-1}$ and $A_{loop}$ and $\omega$ are the area of the loop and the frequency of the driving B-field, respectively. The peak induced voltage $V_0$ is therefore given by $V_0 = A_{loop}\omega B_0$.

The circuit has a well-known resonance frequency $\omega_0 = (LC)^{-0.5}$ and resonance spectral width of $\tilde{}R/L$. The resulting peak current flow around the circuit loop, $i_{loop}$, is given by $$i_{loop} = \frac{V}{Z} = \frac{jA_{loop}\omega B_0}{Z},$$

$$Z = R + j(-\omega L + 1/\omega C)$$

The current results in a magnetic moment (per unit density) of $$m = \frac{i_{loop} A_{loop}}{V}.$$

where $i_{loop}$ and V are the loop current and unit-cell volume (i.e. the volume occupied by each meta-atom), respectively. The meta-material therefore exhibits a magnetic response, with an associated permeability μ

$$\mu = \mu_0\left(1 + \frac{\mu_0 m}{B_0}\right) = \mu_0\left(1 + \frac{j\mu_0\omega A_{loop}^2}{VZ}\right) = \mu_0\mu_r$$

$$\mu_r = \left(1 + \frac{j\mu_0\omega A_{loop}^2}{VZ}\right)$$

where $\mu_0$ is the permeability of free space. The refractive index n of the medium is $n=\sqrt{\varepsilon_r\mu_r}$, where $\varepsilon_r$ is the relative permittivity. Thus by appropriate choice of the lumped circuit parameters 31 (L), 32 (C) and 33 (R), the response of the meta-atom circuit (and therefore the refractive index of the meta-material) at the driving frequency ω can be selected.

In practice, the lumped element parameters are a function of the microstructural parameters and material composition of the unit cell.

Figure 11:
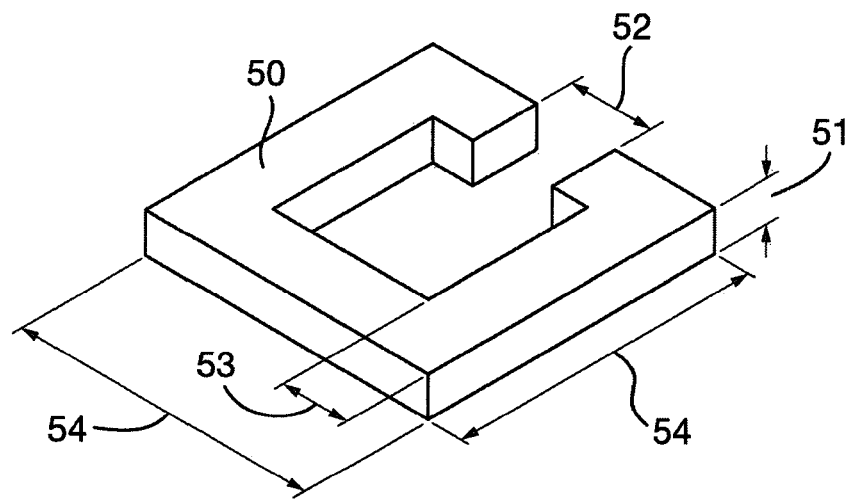
FIG. 11 Shows diagrammatically a meta-atom split ring resonator.

FIG. 11 shows a well-known meta-atom arrangement a split-ring resonator (SRR) 50, having thickness (t) 51, a capacitance gap ($d_g$) 52, arm width (w) 53 and side length (l) 54. In this simple design, inductance and resistance are structurally inherent in the circuit loop, whereas the capacitance is provided by the gap in the loop. The equivalent circuit parameters are given by the approximate analytical relations:—

$$L \sim \frac{\mu_0 l^2}{t}$$

-continued $$C \sim \frac{\varepsilon_0 wt}{d_g}$$

$$R \sim \frac{4(l-w)\rho}{wt}, d_g \ll w$$

where the SRR spatial dimensions are defined in FIG. 11 and ρ is the resistivity of the resonator material. The spatial dimensions of the circuit must be much smaller than the wavelength of the exciting radiation in order to define an effective material response such as the one given above.

As the SRR is reduced in size, the loop inductance decreases but the electron self-inductance increases. The result is that the total inductance cannot be made limitlessly small as the characteristic SRR dimension decreases, limiting the resonant wavelength which can be achieved to the near-visible region around ~800 nm, requiring a different meta-material structure for use in visible meta-material applications.

Nonlinearity can be introduced into the basic LCR system by inserting a nonlinear dielectric medium 17 (that is, a medium with a permittivity dependent on applied E-field) in the capacitance gap 52. The resulting nonlinear capacitance $C_{NL}$ is then $$C_{NL} = \frac{\varepsilon_{NL} A_C}{d_g}, \varepsilon_{NL} \sim \varepsilon_0 (1 + \chi^{(1)} + \chi^{(3)} E_g^2)$$

$$\rightarrow C_{NL} = C_0 + \eta E_g^2, \text{ where}$$

$$C_0 = \frac{\varepsilon_0 (1 + \chi^{(1)}) A_C}{d_g} \text{ and } \eta = \frac{\varepsilon_0 \chi^{(3)} A_C}{d_g}$$

where $\varepsilon_{NL}$ is the nonlinear permittivity, $\varepsilon_0$ is the linear permittivity, $\chi^{(1)}$ and $\chi^{(3)}$ are the first and third order susceptibilities respectively, $E_g$ is the electric field in the capacitor gap, and $A_C$=wt is the capacitance plate area. A large E-field 30, can be created in the gap, resulting in a significant change in the nonlinear capacitance. In the basic LCR circuit for η>0, the nonlinear capacitance increases (resulting in a drop in the resonant frequency of the circuit) as the exciting field intensity is increased. Nonlinear effects in meta-materials have been exploited in the GHz frequency range, for example, for, optimising second harmonic generation.

It is important to note that the capacitance of the nonlinear element constituting the coupling capacitor may be controlled by adjusting the bias voltage across it.

Figure 12:
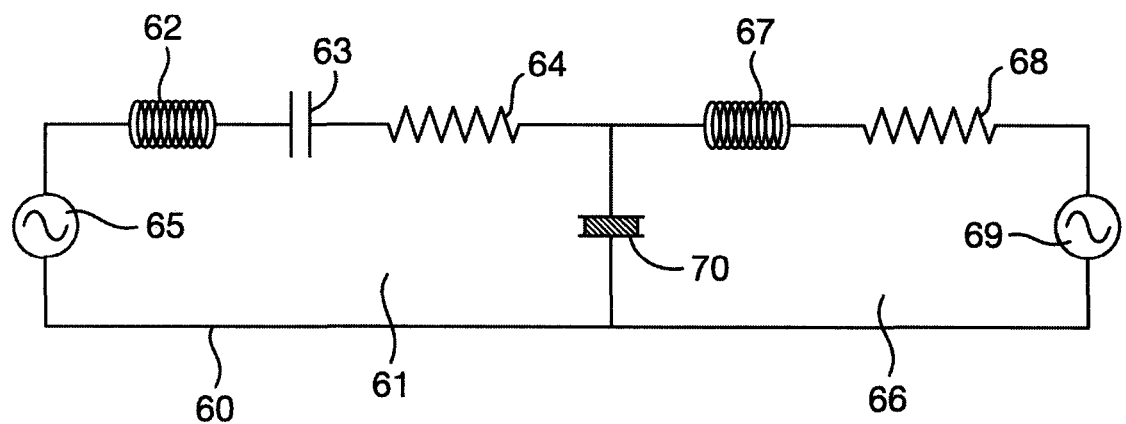
FIG. 12 Shows diagrammatically a meta-molecule formed of two meta-atom circuits.

FIG. 12 shows a 'meta-molecule' 60, formed of two meta-atom circuits. Loop1 61, having inductance 62 ($L_1$), capacitance 63 ($C_1$), resistance 64 ($R_1$) and oscillating voltage 65 ($V_1(t)$). Loop2 66 having inductance 67 ($L_2$), resistance 68 ($R_2$), and oscillating voltage 69 ($V_2(t)$). Loop1 61, and Loop2 66 are combined through a nonlinear capacitor $C_{NL}$ 70.

The dual-LCR arrangement constructs a system exhibiting two excitation responses.

The system can simultaneously couple to a control electromagnetic excitation field (Control Beam) for Loop1 61, and a controlled electromagnetic excitation field (Controlled Beam) for Loop2 66. A non-linear capacitor $C_{NL}$ 70, is necessary to ensure that the two electromagnetic excitation fields are coupled via their mutual interaction with the meta-molecule (i.e. that the superposition principle no longer applies, allowing information from one electromagnetic field to be transferred to another field, with the meta-molecule acting as the intermediary). The circuit can be excited by both B-field and E-field excitation. The circuit represents a generic meta-material solution with application across the whole electromagnetic spectrum.

Figure 13:
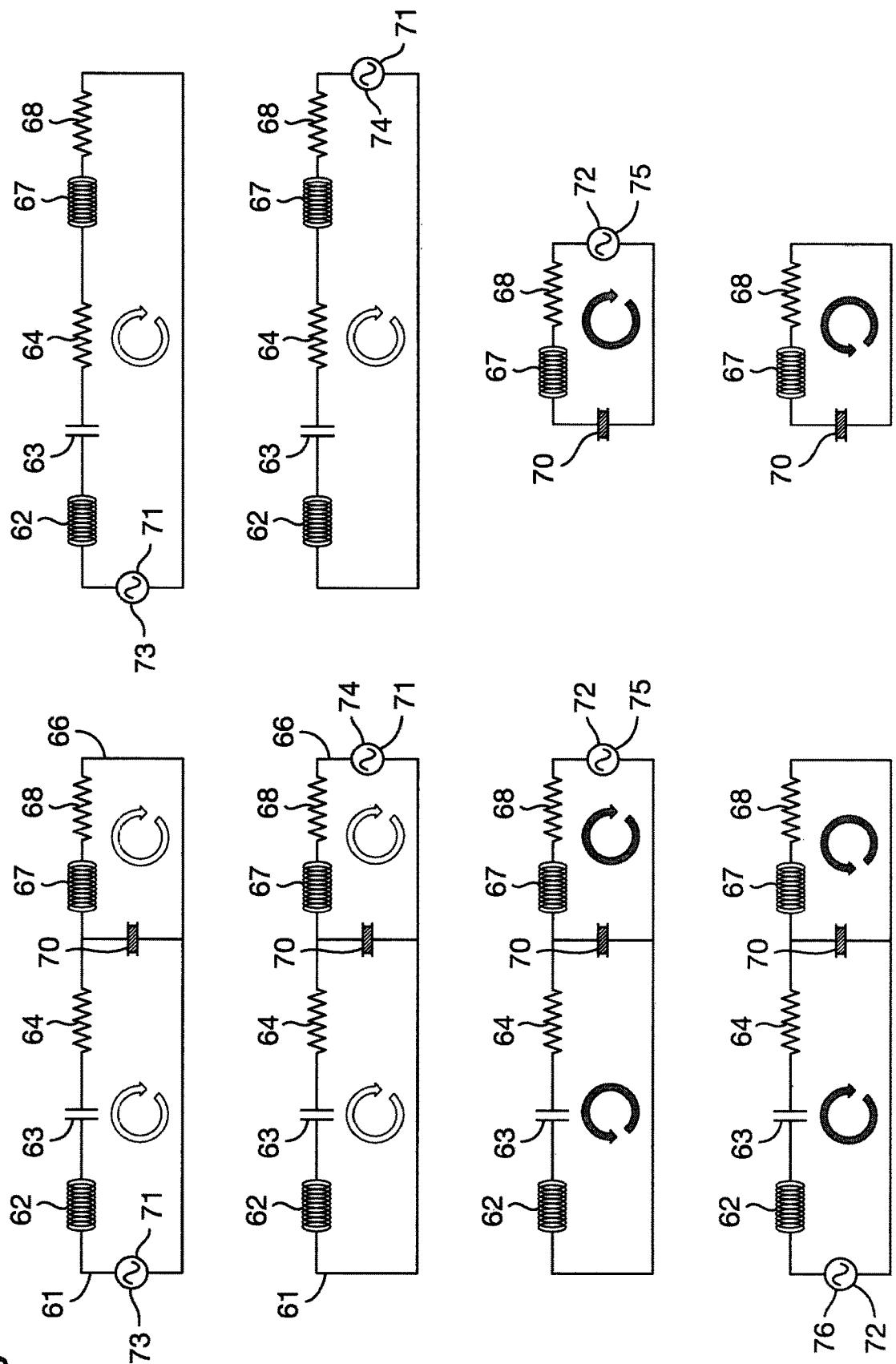
FIG. 13 Shows diagrammatically the circuits under magnetic excitation and the induced circuit responses.

In FIG. 13 it is shown that the B-field orientations of the control beam (at frequency $\omega_1$) 71, and controlled beam (at frequency $\omega_2$) 72, are chosen such that both beams interact with both circuit loops, resulting in four voltage sources in the meta-molecule circuit. Voltage $V_{kl}$ denotes the voltage induced around loop k (k=1 for Loop1 or 2 for Loop2) by beam I (I=1 for beam 1, and 2 for beam 2). The individual voltage sources are shown in FIG. 13.

The meta-molecule circuit has two resonances, at frequencies $\omega_{01}$ and $\omega_{02}$. In the first resonance mode driven by 73 ($V_{11}$), and 74 ($V_{21}$), the currents in Loop1 61 and Loop2 66 oscillate in the same rotational sense shown by the rotational arrows. In the second resonance mode driven by 75 ($V_{22}$), and 76 ($V_{12}$), the currents in Loop1 61, and Loop2 66 oscillate in the opposite rotational sense with respect to one another.

The first resonance frequency, ($\omega_{01}$), is set equal to the frequency 71 ($\omega_1$) of the weak (low intensity) control beam. This ensures a strong, resonant meta-molecule response such that the voltage across the nonlinear coupling capacitor $C_{NL}$ 70, and therefore the value of $C_{NL}$ 70, is dominated by the voltage sources 73 ($V_{11}$), and 74 ($V_{21}$), associated with the control beam at frequency 71 ($\omega_1$) assisted by the enhancement to the nonlinear effect which is a characteristic feature of meta-materials.

The circuit parameters are chosen as described below such that ($\omega_{01}$) is only weakly-dependent on 70 ($C_{NL}$); this ensures that the peak of the resonance curve shifts only slightly relative to 71 ($\omega_1$) when the control beam turns on. As the peak of the resonance at ($\omega_{01}$) (where the resonance curve is locally flat) is chosen to coincide with $\omega_1$ (i.e. $\omega_{01}=\omega_1$), and by choosing the resistive elements to produce a broad resonance around ($\omega_{01}$) (recalling that the resonance width scales linearly with resistance), the change in meta-molecule response at 71 ($\omega_1$), and therefore the refractive index at ($\omega_1$) due to the shift in the resonance curve is therefore small. This ensures that the effect of the controlled beam on itself via the medium is negligible, and that it is not itself deflected or focussed as it propagates through the refraction device 1.

Figure 14A:
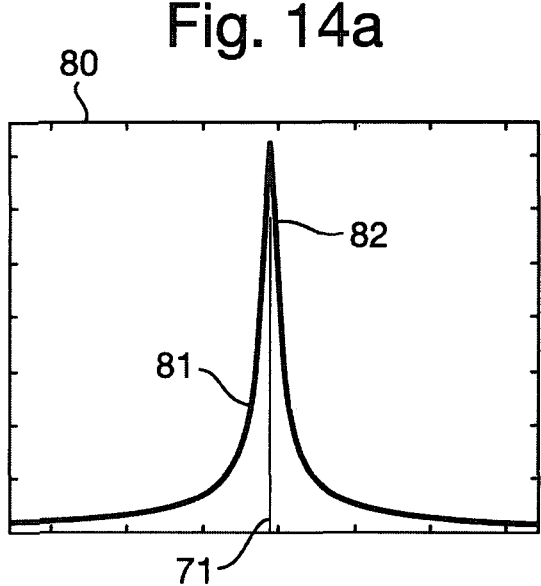
FIG. 14a Shows diagrammatically the first circuit resonance with its peak at the frequency of the control beam.

FIG. 14a illustrates this behaviour. The plot shows the system response 80 $S_{11}(\omega)$, defined as the reciprocal of the impedance seen by 73 ($V_{11}$), which is a function of the applied frequency (ω). Regardless of whether the control beam is switched off 81 ($C_{NL}=C_0$), or on 82 ($C_{NL}>C_0$, assuming η>0), the peak of the resonance curve remains fixed relative to the control beam frequency ($\omega_1$).

The second resonance frequency of the circuit ($\omega_{02}$), is set near (slightly above or below) the frequency 72 ($\omega_2$) of the strong (high intensity) controlled beam. Providing the intensity of the controlled beam is not too high, this off-resonance condition ensures that the effect of 75 ($V_{22}$), and 76 ($V_{12}$), on 70 ($C_{NL}$) is less than that of 73 ($V_{11}$), and 74 ($V_{21}$), (i.e. the control beam dictates the voltage across the coupling capacitor). The circuit parameters are chosen such that ($\omega_{02}$) is strongly-dependent on 70 ($C_{NL}$); this ensures that the peak of the resonance curve near 72 ($\omega_2$) shifts significantly when the control beam turns on. As ($\omega_{02}$) is chosen such that 72 ($\omega_2$) is on the rising edge (or falling edge) of the resonance curve (where the curve is not flat), and by choosing the resistive elements to produce a narrow resonance around ($\omega_{02}$), the change in meta-molecule response at 72 ($\omega_2$) and therefore the refractive index at 72 ($\omega_2$) due to the shift in the resonance curve is therefore large.

Figure 14B:
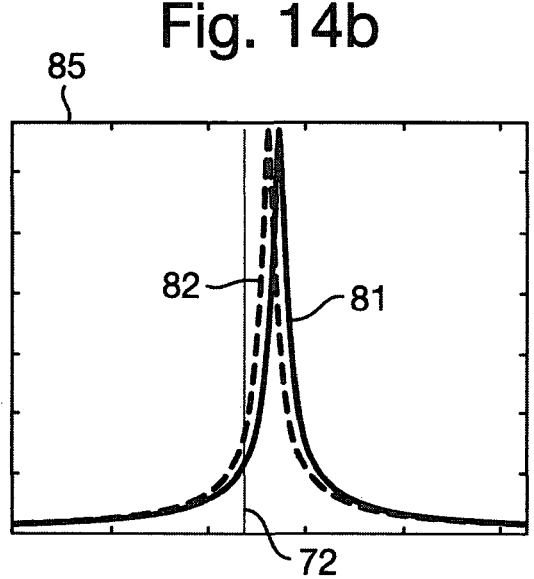
FIG. 14b Shows diagrammatically the second circuit resonance with its peak near the frequency of the controlled beam FIG. 15 Shows diagrammatically a folded three dimensional meta-molecule unit cell.

FIG. 14*b* shows this effect, the system response 85 ($S_{22}(\omega_2)$), being defined as the reciprocal of the impedance seen by 75 ($\omega_2$), as a function of ($\omega$). A change in the capacitance 70 ($C_{NL}$) results in a shift in the resonance curve, modifying the response of the meta-molecule to the controlled beam and, as analysed further below, ultimately the refractive index of the meta-material at 72 ($\omega=\omega_2$).

In order to obtain the desired circuit behaviour, the circuit parameters must be chosen accordingly. To ensure that the control beam is insensitive to changes in $C_{NL}=C_0+\eta E^2$ ($\eta E^2 \ll C_0$), choose $$\frac{1}{\omega_1 C_0} \gg \omega_1 L_2 \Rightarrow \frac{1}{L_2 C_0} \gg \omega_1^2$$

This ensures that the impedance of $C_{NL}$ is much larger than $L_2$.

The circuits for 73 ($V_{11}$), for 74 ($V_{21}$) in FIG. 13 left hand side then reduce to the form shown in FIG. 13 right hand side. Demanding that the system is resonant at frequency $\omega_1$ when the above condition is satisfied requires that $$\omega_{01}^2 = \frac{1}{C_1(L_1+L_2)} = \omega_1^2$$

These considerations result in the condition $$\frac{C_1}{C_0} \gg \frac{L_2}{(L_1+L_2)}$$

$$\Rightarrow \frac{C_1}{C_0} \gg \frac{L_2}{L_1}, L_1 \gg L_2$$

For $L_1 \gg L_2$, which implies $\omega_2 > \omega_1$ and $\omega_2 L_1 - 1/(\omega_2 C_1) > 0$, can then choose $$\frac{1}{\omega_2 C_0} \ll \omega_2 L_1 - \frac{1}{\omega_2 C_1} \Rightarrow \frac{1}{L_1}\left(\frac{1}{C_0}+\frac{1}{C_1}\right) \ll \omega_2^2$$

to ensure that 75 ($V_{22}$) and 76 ($V_{12}$) see an effective circuit in which the impedance of 70 ($C_{NL}$) is much smaller than that of the series combination $L_1 C_1 R_1$.

As discussed above, the circuit resonance $\omega_{02}$ is detuned slightly relative to the controlled frequency 72 ($\omega_2$), by an amount $\Delta\omega=\omega_2-\omega_{20}$.

Then $$\omega_2^2 \sim \frac{1+2\delta}{L_2 C_0} \sim \frac{1+2\delta}{\omega_{02}^2}$$

where $|\delta|=|\Delta\omega/\omega_2| \ll 1$ in the above expression is the resonance frequency when the control beam is off i.e. $C_{NL}=C_0$). The expressions involving 72 ($\omega_2$) lead to the condition:

$$\frac{C_1}{C_0} \gg \frac{L_2}{L_1(1+2\delta)-L_2}$$

For $L_1 \gg L_2$ and $\delta \ll 1$ this condition reduces to:

$$\frac{C_1}{C_0} \gg \frac{L_2}{L_1}$$

which is the same condition as that derived earlier in reference to the control beam. Thus the constraints imposed on the circuit by both the control and controlled beams are compatible.

The resonance spectral widths are $\sim(R_1+R_2)/(L_1+L_2)$ and $\sim R_2/L_2$ for the meta-molecule resonances at $\omega_{01}$ and $\omega_{02}$, respectively. By choosing $R_1$ and $R_2$ appropriately (either via suitable choice of materials, and/or by the dimensions of the microstructural features in the meta-molecule), the resonance widths can be selected. As discussed above, the resonance at $\omega_{01}$ is made sufficiently broad whilst the resonance at $\omega_{02}$ is made sufficiently narrow (with the exact widths dependent on the requirements demanded by the specific application). The characteristic timescale for the system to respond to changes in the intensity of the control beam is $\sim(L_1+L_2)/(R_1+R_2)$.

Note that in FIG. 13 voltage sources 73 ($V_{11}$), and 74 ($V_{21}$), support each other in terms of producing current flow in both loops, whereas voltage sources 75 ($V_{22}$), and 76 ($V_{12}$) tend to counteract one another (a consequence of the anti-mode behaviour). Whilst this may be useful for limiting the current flow in the circuit due to a strong controlled beam, it also means that the magnetic moments generated in Loop 1 61, and Loop 2 66, oppose each other.

Figure 15:
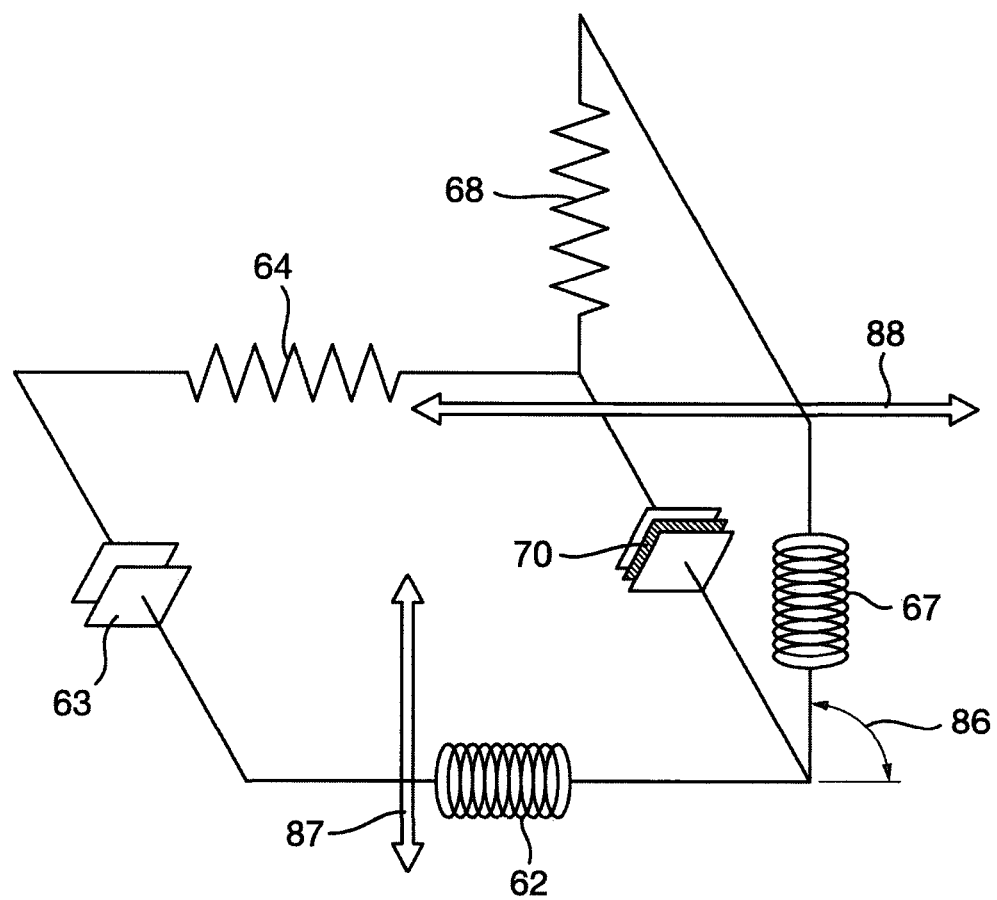

FIG. 15 shows a folded 3-dimensional meta-molecule unit cell based on two orthogonally-coupled LCR resonators under two-frequency (e.g. two-colour) B-field excitation. The system is constructed in which 76 ($V_{12}$), and 74 ($V_{21}$), are set to zero, with the primary voltages being 73 ($V_{11}$); and 75 ($V_{22}$), used to drive the circuit. This in principle could be achieved by folding Loop 2 66, relative to Loop 1 61, and setting the polarisation of the control beam substantially orthogonal to that of the controlled beam. For 86 ($\theta$)=90 degrees, 76 ($V_{12}$)=0 and the system oscillates at ($\omega_2$) only in response to 75 ($V_{22}$). In addition, 74 ($V_{21}$)=0, but the main effect of the control beam is provided by 73 ($V_{11}$).

Figure 1:
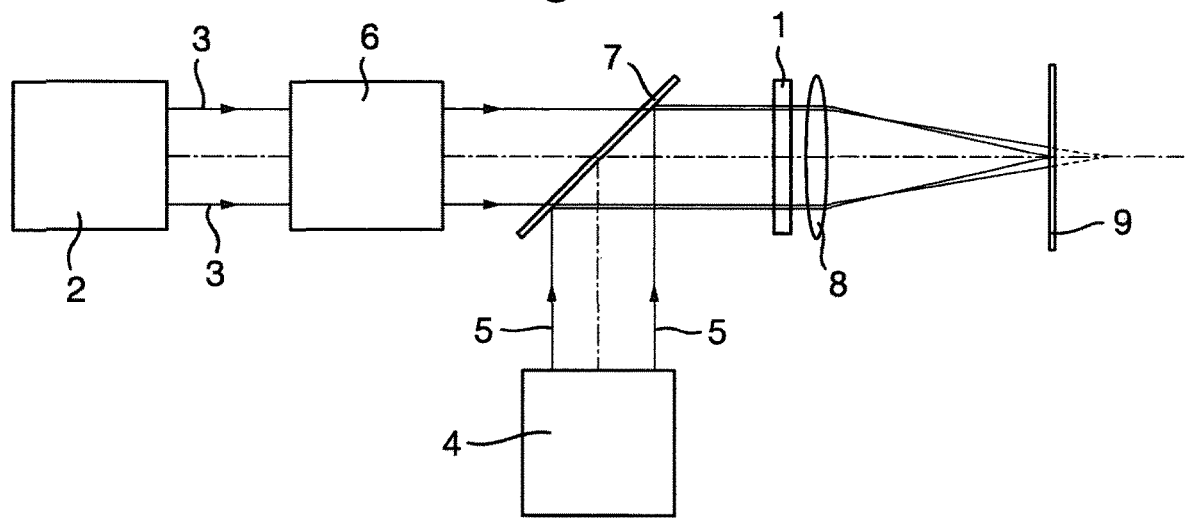
FIG. 1 Shows a typical two colour laser beam line.

In this case the weak control beam 87, couples to the larger of the two loops (implied by $L_1 \gg L_2$), whereas the strong controlled beam 88, couples to the smaller of the two loops. This ensures that the meta-molecule collects as much of the weak control beam 87 B-field as possible whilst minimising the amount of strong controlled beam 88 B-field collected. Furthermore this arrangement ensures that the mutual inductance (which would affect the resonance frequencies of the meta-molecule) between the current loops is zero. (In the 'folded circuit' case as described above it is possible in principle to have a special case in which the control and controlled beam frequencies are equal. The beams are then distinguished by their polarisation states (the one interacting with loop 2 being the controlled beam), and the dichroic beam combiner 7, in FIG. 1 would be replaced with a polarising beam combiner. However choosing the control beam frequency to be lower than that of the controlled beam (two-colour system) has an advantage in that loop 1 can then be scaled up in size relative to loop 2, thereby presenting more loop area for the control beam (which is weak) to interact with, and therefore induce a higher voltage around loop 1).

The analysis can continue taking $V_{21}$ and $V_{12}$ equal to zero. From the effective circuit seen by 73 ($V_{11}$), on the right hand side of FIG. 13, the peak voltage $V_C$ across $C_{NL}$ is given by $$V_C \sim V_{11} \left| \frac{-j\omega_1 L_2 + R_2}{R_1 + R_2} \right| = V_{11} \cdot \frac{(\omega_1^2 L_2^2 + R_2^2)^{1/2}}{R_1 + R_2} = E_g d_g$$

where $V_{11} = \omega_1 A_1 B_1$, and $E_g$ and $d_g$ are the magnitude of the electric field in the capacitor gap and plate separation of the coupling capacitor $C_{NL}$ 70, respectively.

Taking $$B_1^2 = \frac{2\mu_0 I_1}{c},$$

where $I_1$ is the intensity (W/cm$^2$) of the control beam and $c$ is the speed of light in vacuum and combining the above expressions yields $$E_g^2 = \frac{2\omega_1^2 A_1^2 \mu_0}{c d_g^2} \cdot \frac{(\omega_1^2 L_2^2 + R_2^2)}{(R_1 + R_2)^2} \cdot I_1$$

$$C_{NL} = C_0 + \eta E_g^2,$$

$$\rightarrow C_{NL} = C_0 + \beta I_1, \text{ where } \beta = \eta \cdot \frac{2\omega_1^2 A_1^2 \mu_0}{c d_g^2} \cdot \frac{(\omega_1^2 L_2^2 + R_2^2)}{(R_1 + R_2)^2}$$

Once the rapid circuit transients have settled down (following a change in $I_1$), the current $i_{22}$ flowing around loop 2 due to the controlled beam at frequency $\omega_2$ is given by $$i_{22} \sim \frac{V_{22}}{Z_2(\omega_2)}, \text{ where } Z_2(I_1) = j\left(-\omega_2 L_2 + \frac{1}{\omega_2 C_{NL}(I_1)}\right) + R_2$$

The permeability of the meta-material at frequency $\omega_2$, which is determined by the value of $C_{NL}$ 70, and therefore the intensity of the control beam, is then approximately given by $$\mu(I_1) \sim \mu_0 \left(1 + \frac{j\mu_0 \omega_2 A_2^2}{V_m Z_2(I_1)}\right)$$

$$\mu(I_1) \sim \mu_0 \mu_r, \mu_r = \left(1 + \frac{j\mu_0 \omega_2 A_2^2}{V_m Z_2(I_1)}\right)$$

where $V_m$ is the volume of the meta-molecule unit cell and $\mu_r$ is the relative permeability.

Approximate calculation of $\gamma$:

To calculate $\gamma = dn_2/dI_1$, a key performance parameter which determines the change in the refractive index at $\omega_2$ due to a change in the control beam intensity, relative to the $I_1 = 0$ (control beam off) state, start with the basic expression for refractive index (at the frequency of the controlled beam) $n_2 = (\varepsilon_r \mu_r(I_1))^{1/2}$ and differentiate it with respect to $I_2$ to give $$\frac{dn_2}{dI_1} = \frac{\varepsilon_r^{1/2}}{2\mu_r^{1/2}} \frac{d\mu_r}{dI_1} \sim \frac{1}{2} \frac{d\mu_r}{dI_1}, \varepsilon_r = 1, \mu_r \sim 1$$

Differentiating the relative permeability with respect to $I_1$ yields $$\frac{d\mu_r}{dI_1} = -\frac{j\mu_0 \omega_2 A_2^2}{V_m} \cdot \frac{1}{Z_0^2} \cdot \frac{dZ_2}{dI_1}, \text{ where}$$

$$Z_0 = Z_2(I_1 = 0) = j\left(-\omega_2 L_2 + \frac{1}{\omega_2 C_0}\right) + R_2$$

$$\frac{dZ_2}{dI_1} = \frac{dZ_2}{dC_{NL}} \cdot \frac{dC_{NL}}{dI_1} = \frac{dZ_2}{dC_{NL}} \cdot \beta$$

For $|\delta| = |\Delta\omega/\omega_2| \ll 1$ and defining $\alpha = (\Delta\omega L_2)/R_2$ (defined as the detuning measured in the number of spectral widths of the resonance at $\omega_{02}$), $$\frac{1}{Z_0^2} \sim \frac{1 - 4\alpha^2 + 4\alpha j}{R^2(1 + 4\alpha^2)^2}$$

$$\sim \frac{j - \alpha}{4R^2 \alpha^3} \text{ for } 4\alpha^2 \gg \gg \text{ (i.e. } \alpha \gg 0.5)$$

and $$\frac{dZ_2}{dC_{NL}} \sim \frac{-j}{\omega_2 C_0^2}$$

Combining the expressions above yields the approximate relation $$\gamma = \frac{dn_2}{dI_1} \sim \frac{\mu_0 A_2^2 \beta}{8 V_m \alpha^2 R_2^2 C_0^2} - \frac{\mu_0 A_2^2 \beta}{8 V_m \alpha^3 R_2^2 C_0^2} j$$

The change in the real part of the refractive index $\Delta n_{2r}$ is therefore proportional to the real part of $\gamma$:—

$$\Delta n_{2r} = \gamma_r \cdot I_1 = \frac{\mu_0 A_2^2 \beta}{8 V_m \alpha^2 R_2^2 C_0^2} I_1, \text{ where}$$

$$\gamma_r = \text{Re}(\gamma) = \frac{\mu_0 A_2^2 \beta}{8 V_m \alpha^2 R_2^2 C_0^2}$$

This formula shows that there is a simple relationship between the intensity $I_1$ of the control beam and the corresponding refractive index change induced in the refraction device at the controlled beam frequency. Correspondingly, spatiotemporal variations in the intensity $I_1$ of the control beam give rise to spatiotemporal variations in the refractive index experienced by the controlled beam. Such refractive index variations are the basis of operation for the dynamic refraction device.

Modes of Operation:

One realisation of the B-field excited system is shown in FIG. 2.

By way of example this system could be employed to effect focussing control of fibre lasers in machining applications. For example ytterbium (Yb) fibre lasers operating at a wavelength of 1064 nm, repetition rates >10 kHz, pulse duration up to several hundred nanoseconds and average power >20 W have been used to machine silicon substrates for use in microelectromechanical systems (MEMS) and the semiconductor industry. In order to control such a laser using the system and method described here, the control laser would preferably be matched to the controlled laser in terms of its repetition rate and pulse duration so that focus control can be utilised during each laser pulse. Examples of potential control lasers include erbium fibre, thulium fibre and holmium:YLF lasers operating at wavelengths of 1550 nm, 1900-2050 nm and 2050 nm or 2060 nm respectively.

For a controlled laser with a=4 mm focussed to a spot radius $r_1$=50 um on a target using a main focussing lens with focal length $f_2$=250 mm, a weak dynamic lens with $f_1$~19750 mm would result in a shift in the focus position of 3.1 mm to best focus ($r_2$=0 um). This assumes the focussed beam behaves according to geometric optics; in reality the beam is focussed to a finite-sized waist. Taking into account the Gaussian nature of the beam (assuming a typical fibre laser beam quality parameter $M^2$=1.8), the spot radius on target is reduced from ~63 um to ~38 um when the dynamic lens is activated. For a dynamic lens with length L=0.2 mm, a refractive index change $\Delta n$ of approximately $2\times10^{-3}$ is required. A prototype dual-SRR design is developed below to realise the dynamic lens necessary for this zooming example.

To design the dual split-ring resonator structure, the dimensions of known single split-ring resonator designs are scaled and then fine-tuned to ensure that the circuit resonance frequencies are correct, according to the operating wavelengths of the control and controlled beams and the prescription given above. For an ytterbium fibre laser operating at a wavelength of 1064 nm controlled by a Ho:YLF laser operating at 2060 nm, example parameters for the control ring are 1.330 nm, w=130 nm, t=17 nm and $d_g$=90 nm (for a capacitance plate area of $1.4\times10^{-15}$ m$^2$); example parameters for the controlled ring are l=100 nm, w=50 nm, t=15 nm and $d_g$=33 nm. Taking $X^{(3)}$~$6\times10^{-20}$ (m/V)$^2$ (e.g. corresponding to potassium dihydrogen phosphate (KDP) crystal or other nonlinear material in the coupling capacitor gap), detuning parameter $\alpha$=−3, $V_m$=$2\times10^{-20}$ m$^3$, $\rho$=1.59$\times10^{-8}$ $\Omega$m and peak powers of 10 kW and 1 kW for the controlled and control beams respectively, the design equation given above yields $\Delta n$~$2\times10^3$, as demanded by the zooming example. For the fibre lasers considered here, a typical pulse duration used for machining is ~200 ns and a typical repetition rate is 25 kHz.

Considerable tuneability is a feature of this dual-SRR design and a number of variations on the concept shown in FIG. 2 are possible. Within the unit cell there may be spatial variations in material composition and conductor dimensions (for example, the conductor track width and height in the vicinity of a gap may be adjusted to fine tune the gap capacitance). In the split ring resonator corresponding to the control beam, multiple capacitance gaps might be employed and/or linear dielectric material inserted in one of more of those gaps for greater design flexibility. The split-ring resonators may take on other geometrical shapes to those shown in FIG. 2, including asymmetric shapes.

There may also be variations from one meta-molecule to the next within the material lattice to permit, for example, more/less sensitivity in the centre of the refraction device 1 relative to the edge, or multiple control beams with multiple frequencies (colours) to be employed.

Other embodiments may introduce nonlinearity into an LCR resonator circuit. For example, in non-linear meta-materials operating at GHz frequencies, a discrete circuit component may act as the non-linear capacitor. For example, semiconductor diodes (varactors) exhibit voltage-dependent capacitance. One such element has a voltage-dependent capacitance of the form $$C_{NL} = C_0\left(1 - \frac{V_D}{V_P}\right)^{-M}$$

where $C_0$ is the zero-bias voltage, and M and $V_P$ are characteristic performance coefficients for the diode (referred to as the gradient coefficient and intrinsic potential, respectively).

It is also possible to excite split-ring resonator circuits with an oscillating electric field. Qualitatively, when the circuit parameters are chosen as described above, the control electric field $E_1$ rather than $B_1$ at frequency $\omega_1$ will draw current around the circuit in a manner similar to the top diagram 13. Similarly, the controlled field $E_2$ at frequency $\omega_2$ will draw current primarily around the smaller-area loop as in the lower diagram in FIG. 13. Depending on the relative orientations of the electric and magnetic fields associated with the control and controlled beams relative to the resonant circuits, the effective permeability and/or effective permittivity of the meta-material medium can be modified. Another variation of the SRRs would have the two coupled split-ring resonators lie in the same plane, simplifying the fabrication of the meta-material.

However, it will be appreciated by a person skilled in the art that the size (area and height), geometry and material choice for each lumped element can be used as variables to fine tune the circuit performance.

It is also to be appreciated that the refracting medium may also have discrete focal zones following the Fresnel Lens principle. The Fresnel principle can be applied to laser-controlled optics i.e. to reduce the power requirement for the controlling beam in the scheme described herein.

Figure 16:
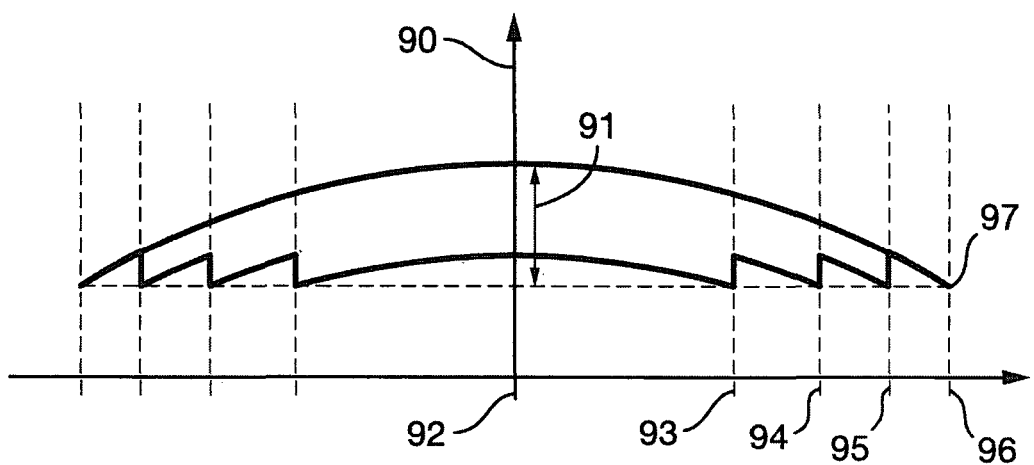
FIG. 16 Shows diagrammatically the refractive index both positive and negative as a function of position of the zones.
Figure 16:
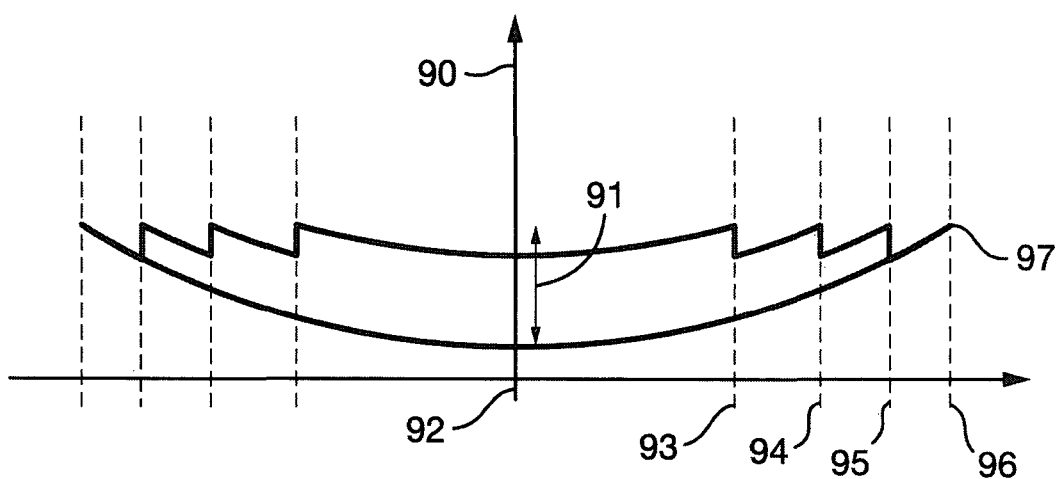

FIG. 16 illustrates the spatial refractive index profile for both a graded index lens and its Fresnel equivalent.

Where 90 is n(r), 91 is $\Delta n$, 92 is zero, 93 is $r_1$, 94 is $r_2$, 95 is $r_k$, 96 is a and 97 is $n_0$ The upper part of FIG. 16, shows a spatial refractive index profile for a graded-index positive lens (The constant curve showing a single zone baseline refractive profile and the segmented line showing the discrete focal zones, its Fresnel equivalent. In the bottom part of FIG. 16 the corresponding plots for a graded-index negative lens and its Fresnel equivalent are shown in the negative case.

For a graded-index lens, the refractive index profile is assumed to be parabolic:—

$$n(r) = n_0 + \Delta n\left(1 - \frac{r^2}{a^2}\right)$$

Here r is the radial spatial coordinate, a is the radius of the lens, n0 is the ambient refractive index and ∆n is the additional refractive index induced on axis by the controlling beam ($\Delta n > 0$ for a positive lens, and $\Delta n < 0$ for a negative lens). The focal length f of this lens is approximately given by $$f \sim \frac{a^2}{2L\Delta n}$$

where L is the length of the refracting medium.

The induced refractive index $n(r) - n_0$ is assumed to be proportional to the controlling beam intensity $$n(r) - n_0 = \gamma \cdot I(r)$$

where γ is the coefficient of proportionality, which in general may be positive or negative depending on the properties of the refracting medium (i.e. an increase in the controlling beam intensity may result in an increase or decrease in the refractive index depending on the sign of γ).

The power requirement P for the controlling beam to induce a graded-index lens is given by $$P = \int_0^a I(r) \cdot 2\pi r \cdot dr = \frac{\pi}{2} \cdot \frac{\Delta n}{\gamma} \cdot a^2$$

For the equivalent Fresnel lens the spatial intensity profile in the $k^{th}$ segment is given by $$I_k(r) = I(r) - I(r_k), \quad r_{k-1} \leq r < r_k$$

The controlling beam power requirement for the $k^{th}$ segment, $F_k$, is then $$F_k = \int_{r_{k-1}}^{r_k} I_k(r) \cdot 2\pi r \cdot dr$$
$$= \int_{r_{k-1}}^{r_k} I(r) \cdot 2\pi r \cdot dr - I(r_k) \int_{r_{k-1}}^{r_k} 2\pi r \cdot dr$$
$$= P_k - I(r_k) \cdot \pi [r_k^2 - r_{k-1}^2]$$

where $$P_k = \int_{r_{k-1}}^{r_k} I(r) \cdot 2\pi r \cdot dr$$

is the power required to induce a graded refractive index profile in the $k^{th}$ segment. The area of the $k^{th}$ segment $A_k = \pi[r_k^2 - r_{k-1}^2]$, hence the expression for $F_k$ reduces to $$F_k = P_k - I(r_k) A_k$$

To find the total power required to induce the Fresnel lens F, we sum over the power required for each element:—

$$F = \sum_{k=1}^m F_k = \sum_{k=1}^m P_k - \sum_{k=1}^m I(r_k) A_k$$

where m is the number of Fresnel elements. Taking $$P = \sum_{k=1}^m P_k$$

and assuming all segments have equal area $A_k = \pi a^2/m$ for simplicity, $$F = P - A_k \sum_{k=1}^m I(r_k) = P - \frac{\pi a^2}{m} \sum_{j=k}^m I(r_k)$$

Evaluating the summation on the right-hand side of the above expression, $$\sum_{k=1}^m I(r_k) = \frac{\Delta n}{\gamma} \sum_{k=1}^m \left(1 - \frac{r_k^2}{a^2}\right)$$
$$= \frac{\Delta n}{\gamma} \sum_{k=1}^m \left(1 - \frac{k}{m}\right)$$
$$= \frac{\Delta n}{\gamma} \left(m - \frac{1}{m} \sum_{k=1}^m k\right)$$
$$= \frac{\Delta n}{\gamma} \left(m - \frac{(m+1)}{2}\right)$$
$$= \frac{\Delta n m}{2\gamma} \left(1 - \frac{1}{m}\right)$$

The expression for F then reduces to $$F = P - \frac{\pi \Delta n a^2}{2\gamma}\left(1 - \frac{1}{m}\right) = P - P + \frac{P}{m}$$

leading to the final result $$F = \frac{P}{m}$$

i.e. that the power requirement to induce a Fresnel lens with m elements of equal area is a factor of m lower than that required to induce a parabolic graded-index lens with the same focal length.

Fresnel Prism

Figure 17:
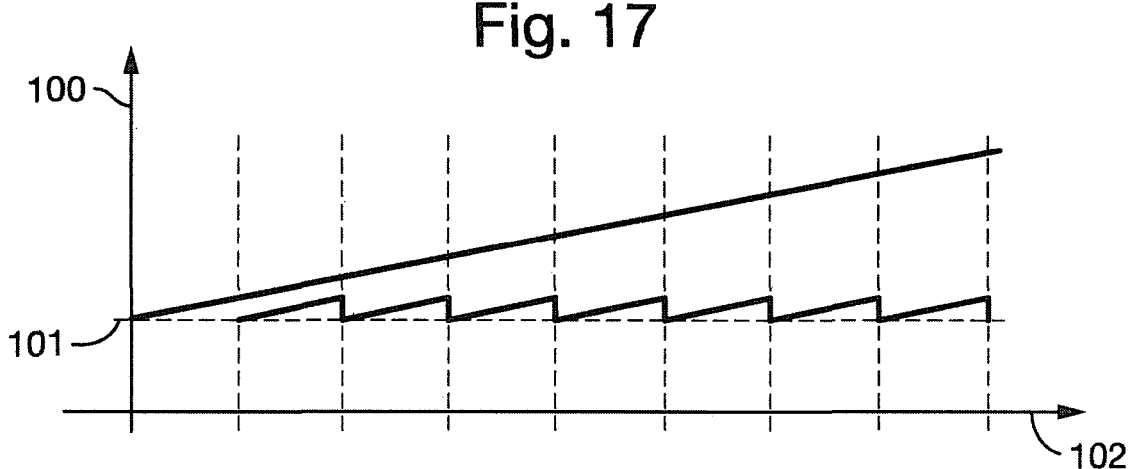
FIG. 17, shows diagrammatically refractive index variations as a function of position when creating a prim variation of the device.

The same result F=P/m is obtained for a linear refractive index profile (prism), which would be required to implement beam deflection (FIG. 17), where n(x) is 100, $n_0$ 101 and x is 102.

A ray passing through a medium of length L and refractive index gradient dn/dx is deflected by an angle $$\sim L \cdot dn/dx$$

As described above, it will be appreciated that in order to operate in other frequency ranges of the electromagnetic spectrum, and particularly in the visible region, a different arrangement of the refraction device unit cell is required such that other material responses can be used to vary the refractive index of the device.

In order to provide a convenient framework for the design of such meta-materials, the 'lumped element' circuit approach described earlier can be extended to visible frequencies as shown by, Engheta et al.

Figure 18:
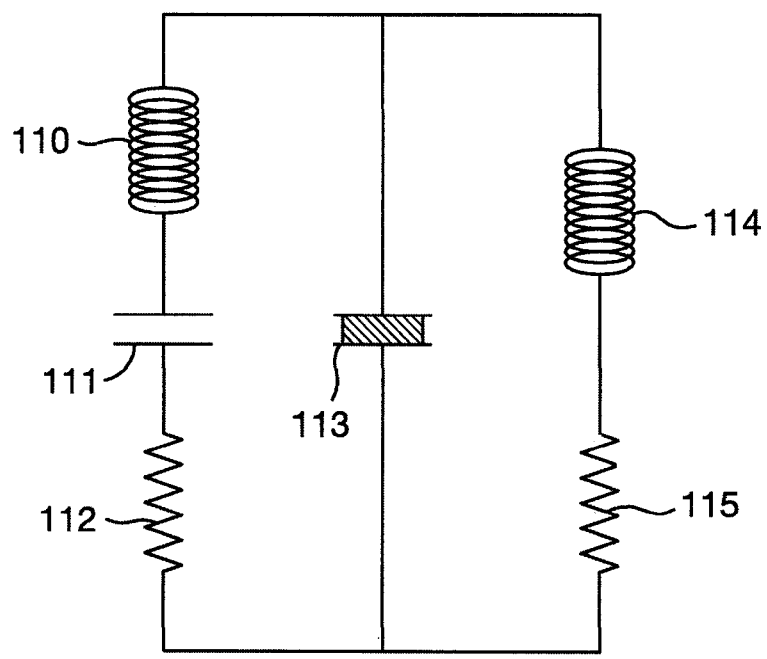
FIG. 18 shows diagrammatically a meta-material unit cell modelled as a lumped-element circuit for the visible spectrum.

As can be seen in FIG. 18 where $L_1$ is 110, $C_1$ is 111, $R_1$ is 112, $C_{NL}$ is 113, $L_2$ is 114 and $R_2$ is 115

The key feature is that at visible electromagnetic frequencies the flow of displacement current (J=−iωεE) around the effective circuit dominates conduction current (J=σE) which is prevalent at lower frequencies.

Figure 19:
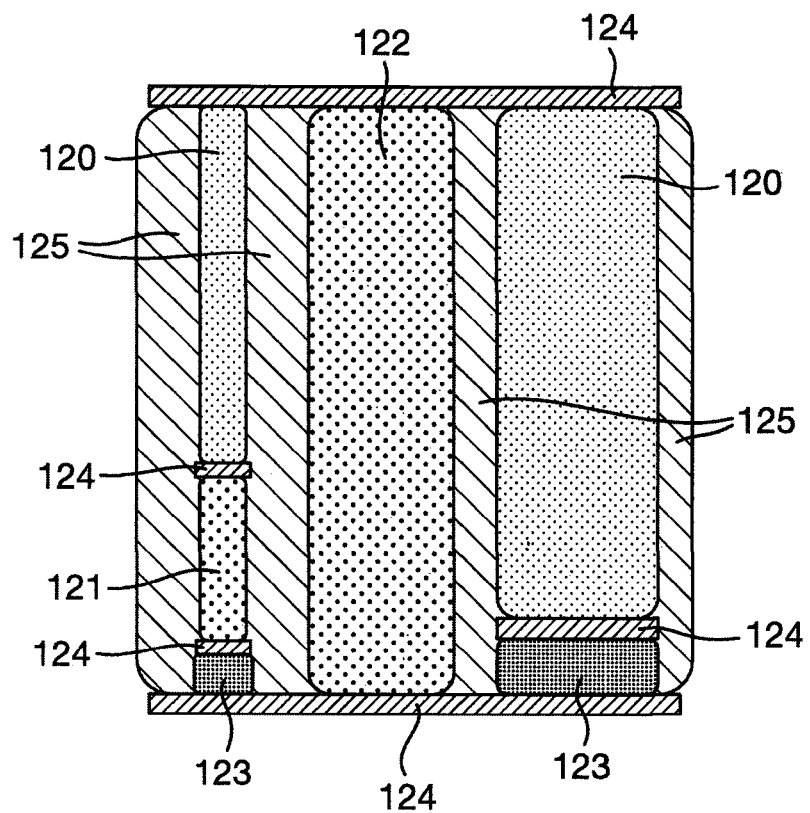
FIG. 19 shows the 'Engheta' metatronics approach of creating the circuit of FIG. 18 using specific construction parts having the necessary equivalent electrical function.

As seen with FIG. 19 within this 'optical circuit' analogy, the material permittivity takes the role of a conductivity, and circuit connectors (high conductivity) and insulators (low conductivity) are correspondingly formed from materials, 124 is $|\text{Re}(\varepsilon)| \gg \varepsilon_0$, and 125 is $|\text{Re}(\varepsilon)| \ll \varepsilon_0$, respectively. Furthermore, 'capacitive' and 'inductive elements can be formed from materials, 122 is $\text{Re}(\varepsilon) > \varepsilon_0$, and 120 is $\text{Re}(\varepsilon) < \varepsilon_0$, respectively, and resistive elements from materials 123, is $\text{Im}(\varepsilon) \neq \varepsilon_0$.

It will appreciated by a person skilled in the art that this arrangement provides for the control of a strong high power visible electromagnetic beam (e.g. Laser beam) with a relatively weak low power visible electromagnetic beam (e.g. Laser beam).

For example, at optical frequencies the split-ring resonator of FIG. 11 can be replaced by a ring of plasmonic nanoparticles around which a circulating displacement current flows (rather than conduction current) in response to a time-varying electric or magnetic field (A. Alù et al, *Negative effective permeability and left-handed materials at optical frequencies*, Opt. Exp. 14, 1557 (2006)). To realise the dual-SRR circuit of FIG. 15, a pair of such rings can be envisaged arranged orthogonally to one another and with at least one nanoparticle with a nonlinear response common to both rings and providing the coupling (flow of information from the control to controlled beam) between them.

It is also known that a displacement current loop can be induced in a dielectric particle (via a Mie magnetic dipole resonance) by an electromagnetic field. The current flows in an effective circuit analogous to FIG. 11 and L, C, and R parameters can be derived which depend on the size and refractive index of the particle (L. Y. Liu et al, *Artificial magnetic properties of dielectric meta-materials in terms of effective circuit model*, Prog. Elec. Res. 116, 159 (2011)). To realise the dual-LCR circuit of FIG. 15, a pair of co-joined dielectric particles can be envisaged, with a nonlinear dielectric region common to both particles providing the coupling (flow of information from the control to controlled beam) between them.

Circuit elements such as those shown in FIG. 15 can also be employed in two-dimensional meta-layers, rather than in three-dimensional arrays as described above. It is also to be appreciated that multiple two-dimensional meta-layers can be arranged in series, and designed to modify the energy transmission and phase of electromagnetic waves in a controllable way. The concepts described here can also be applied to such two-dimensional meta-layer-based systems by introducing a nonlinear element (for example a nonlinear capacitor as in the circuit of FIG. 15) and a control beam, the properties of the meta-layer system, and therefore the propagation characteristics of a controlled beam, can be dynamically controlled by varying the spatiotemporal characteristics of the control beam.

The known Engheta optical nanocircuits can be arranged in 2D layers—'meta-surfaces'- to manipulate light propagation and can be analysed using a transmission line approach. Moreover the approach of Monticone et al's was to use three such meta-surfaces to create a 'composite meta-screen' to give enough free parameters to control beam phase whilst simultaneously achieving zero energy loss in the ideal (zero resistance) case. Using the specific nanocircuit as described earlier, beam deflection and zooming may be achieved by using a controlling beam to control the circuit properties 'seen' by the controlled beam.

It will be appreciated that the approach described above in which, the focussing and pointing characteristics of a strong (high intensity) laser beam at one wavelength can be dynamically controlled by a separate weak (low intensity) laser beam at another wavelength, via a refracting medium constructed using the principles of meta-materials, could be used to dynamically vary the size and position of a laser focal spot on a target surface (zooming and deflection, respectively) and as such may have broad and varying avenues for practical application.

A meta-material-based approach is employed to design the structure of the nonlinear refracting medium, allowing the medium response to be tailored according to the wavelengths of interest and the required time response;

The refracting medium can be inserted near the end of an existing laser beamline just before the final focussing optic, thereby minimising the impact of the zooming/deflection capability on the existing optical system i.e. the beam propagation characteristics up to the final focussing lens do not need to be modified in order to accommodate the nonlinear element;

The refracting properties of the nonlinear medium are set by the weak controlling beam at-a-distance, ensuring that the resulting dynamic lens or prism does not require its own local power supply or control components;

By varying the spatial and temporal intensity of the controlling beam as a function of time, the refractive index experienced by the controlled beam can be dynamically controlled.

The refracting medium is composed of an array of meta-molecules; each meta-molecule as described uses a lumped-element circuit approach whereby two LCR circuits are coupled via a nonlinear capacitor to produce a dual-resonant system.

INDUSTRIAL APPLICABILITY

Possible applications aside from the ones described above and as claimed herein may include but are in no way limited to the following:

Inertial Confinement Fusion:

Increasing yields in Inertial Confinement Fusion. Beam zooming can be used to enhance neutron yields in the direct-drive inertial confinement fusion (ICF) scheme for energy production. ICF utilises multiple laser beams to illuminate and implode a millimetre-scale capsule of cryogenic nuclear fuel to achieve conditions in which fusion burn can be initiated and sustained. Beam zooming effectively allows the capsule implosion performance to approach that predicted in idealised one-dimensional calculations, as described in more detail below.

In the initial stages of the laser-capsule interaction, it is desirable to optimise the overlapped beam illumination uniformity to minimise the formation of perturbations which subsequently grow and limit the implosion performance of the capsule. This is achieved by choosing the focal spot radius of each beam to be comparable to the initial radius of the capsule.

As the implosion progresses, the outer layer of the capsule is heated and blows off to form a coronal plasma. This plasma can support Cross-Beam Energy Transfer (CBET), an energy loss mechanism whereby incoming beam energy is backscattered from ion acoustic waves generated by the interaction of opposing beams in the plasma. The gain of this scattering mechanism is proportional to the intensity of outgoing rays from the edges of opposing beams, and is reduced as the focal spot is made smaller. Reducing the focal spot size leads to a reduction in the capsule illumination uniformity. However once the plasma corona has become 'geometrically thick', which occurs when the thickness of the corona becomes comparable With the initial target thickness, energy transport within the corona can smooth out such illumination non-uniformities.

Two ideal beam focussing conditions can therefore be delineated during the implosion. First, at early time when the plasma corona is thin (and CBET favourably weak), the focal spot radius must be made comparable to the initial capsule radius. This is to ensure good illumination uniformity and to minimise the seeding of perturbations which, can disrupt the ideal one-dimensional implosion of the capsule. Second, at later time when the corona has become geometrically thick, the focal spot radius may be reduced to mitigate against CBET, because the corona provides a large conduction zone in which illumination non-uniformities are smoothed out. The two focussing conditions can be achieved using beam zooming. In the ideal case, the two-state zooming system would be replaced by a continuous zooming system as described herein. In this case the focussing conditions would be smoothly varied to always maintain the optimum illumination conditions during the capsule implosion.

In indirect-drive ICF, the cryogenic capsule is imploded via x-ray illumination rather than optical laser radiation. The x-rays are produced by laser irradiation of high-Z (typically gold) hohlraums. In this case beam zooming as described may offer an additional means of optimising the absorption efficiency of laser light into the hohlraum wall.

Dynamic repointing (deflection) of the beam would also potentially lead to a gain in laser-target energy coupling efficiency, for example in the polar direct-drive variation of ICF. This scheme uses fusion-class laser facilities such as the National Ignition Facility NIF at Lawrence Livermore National. Laboratory (LLNL) which have been configured for indirect-drive ICF, and therefore have beams, available in two groups appropriate for propagating through two open ends of a cylindrical hohlraum, rather than in a spherically-symmetrical arrangement more appropriate for a 1D implosion. It is conceivable that dynamic repointing (in addition to zooming) would allow the polar drive configuration to be optimised.

The main laser, pulse designed for ICF applications is typically several nanoseconds in duration and is often preceded by at least one, shorter duration (<1 ns) 'picket' pre-pulse. In order to make efficiency gains through the use of beam zooming, sub-nanosecond (<1 ns) time resolution is required.

The inherent time response (time for current transients to settle down) of the dual resonant, circuit is typically very fast (<1 ps) and can readily satisfy this requirement, however current electro-optic modulation technology, which can be employed to modulate the intensity of the control beam and therefore enable zooming of a controlled beam, has a time resolution of typically 0.1 ns.

Other possible routes of practical application of this dual resonant meta-material include Amplification and Wavelength Conversion:

The applications described above employ dynamic beam zooming and deflection to enhance processes in which a focussed laser interacts with and modifies a target. If the target is replaced by an optical fibre (for example) which instead serves to collect the focussed controlled beam and deliver it to the next stage in an optical system, signal amplification and simultaneous wavelength conversion can be achieved at the fibre output. For example, if the spatial intensity variation of the control beam is chosen to induce a lens in the refraction device, a time-varying intensity signal on the control beam results in a time-varying lens in the refraction device 1. The time-varying lens causes the focal spot of the controlled beam to move closer to or further from the fibre input (i.e. changes its degree of defocus at the fibre input), resulting in more or less light entering the fibre (depending on the location of the fibre input relative to the main focussing lens). As the time-varying signal is now carried on the high-intensity controlled beam in the fibre, the original low intensity signal carried on the control beam has been amplified and wavelength-shifted.

Optical Gating:

If the time-varying intensity signal on the controlling beam is binary (either on or off), and the resulting variation in control beam focus is large enough, the signal at the fibre output will also be binary, resulting in optical gating of the controlled beam. Deflection of the control beam relative to the fibre input (rather than zooming) could also achieve signal amplification and gating.

Two-Way Switching:

The controlled beam could be coupled into one of two fibres at the output on demand by dynamically conditioning the control beam. By choosing the spatial intensity of the control beam to induce a prism in the refraction device 1, the controlled beam can be deflected into one fibre; by reversing the direction of the prism, the controlled beam can be coupled into the other fibre. This would allow the controlled beam to be switched between the two fibre outputs in a controllable way.

The invention claimed is:

1. A meta-material comprising:
a unit cell comprising a first resonant structure and a second resonant structure,
the first resonant structure configured to have inductance, capacitance and resistance features and forming a first equivalent circuit, and the second resonant structure configured to have inductance, capacitance and resistance features and forming a second equivalent circuit,
characterised in that the second equivalent circuit comprises a single capacitance feature forming a common element coupling the first equivalent circuit to the second equivalent circuit, the common element comprising a non-linear dielectric material.

2. The meta-material according to claim 1, characterised in that the dielectric material has a third order nonlinear susceptibility not equal to zero.

3. The meta-material according to claim 1, characterised in that the first resonant structure may comprise any of, a split ring resonator, a ring of plasmonic spheres or a dielectric element.

4. The meta-material according to claim 1, characterised in that the second resonant structure may comprise any of, a split ring resonator, a ring of plasmonic spheres or a dielectric element.

5. The meta-material according to claim 1, characterised in that the first resonant structure is configured substantially orthogonal to the second resonant structure.

6. The meta-material according to claim 1, further comprising a plurality of unit cells, characterised in that the plurality of unit cells are arranged in an array to form a meta-layer.

7. The meta-material according to claim 6, characterised in that the meta-material comprises a plurality of meta-layers separated by a dielectric or a vacuum layer.

8. The meta-material according to claim 1, further comprising a plurality of unit cells, characterised in that the plurality of unit cells are arranged in a three-dimensional array.

9. A dynamic refraction device comprising the meta-material of claim 1.

10. The dynamic refraction device according to claim 9, characterised in that the dynamic refraction device is formed as a secondary dynamic layer on an optical lens.

11. The dynamic refraction device according claim 9, characterised in that the dynamic refraction device comprises discrete focal zones.

12. A method of controlling propagation of a controlled electromagnetic radiation using a control electromagnetic radiation, the method comprising:

directing a controlled electromagnetic radiation through the dynamic refraction device according to claim 9; and directing a control electromagnetic radiation onto the dynamic refraction device which is configured to be resonant to a wavelength of the control electromagnetic radiation, such that a refractive index of the dynamic refraction device experienced by the controlled electromagnetic radiation is substantially determined by the control electromagnetic radiation.

13. The method according to claim 12, characterised in that spatiotemporal variations of characteristics of the control electromagnetic radiation produce spatiotemporal variations in the refractive index experienced by the controlled electromagnetic radiation.

14. The method according to claim 12, characterised in that one of the controlled electromagnetic radiation or the control electromagnetic radiation is a laser in the visible spectrum.

15. The method according to claim 12, characterised in that both the controlled electromagnetic emission and the control electromagnetic emission are lasers in the visible electromagnetic spectrum.

16. The method according to claim 12, characterised in that the control electromagnetic radiation is of a longer wavelength radiation than the controlled electromagnetic radiation.

17. A method of imploding a nuclear fusion fuel source, the method comprising:

directing a controlled electromagnetic radiation through the dynamic refraction device according to claim 9, directing a control electromagnetic radiation onto the dynamic refraction device which is configured to be resonant to a wavelength of the control electromagnetic radiation, such that a refractive index of the dynamic refraction device experienced by the controlled electromagnetic radiation is substantially determined by the control electromagnetic radiation.

18. The method of claim 17, wherein:

the controlled electromagnetic radiation is directed onto the fuel source, the controlled electromagnetic radiation is a laser, and the control electromagnetic radiation is a laser, the method further comprising adjusting characteristics of the control electromagnetic radiation during the implosion of the fuel source such that spatiotemporal properties of the refractive index of the dynamic refraction device correspondingly change, thereby refocusing the controlled electromagnetic radiation relative to the imploding fuel source.

* * * * *